US011637613B1

(12) United States Patent
Learned

(10) Patent No.: US 11,637,613 B1
(45) Date of Patent: Apr. 25, 2023

(54) METHOD AND APPARATUS FOR DETERMINING A RECEIVER BEAM IN A CO-EXISTENCE COGNITIVE RADIO

(71) Applicant: Massachusetts Institute of Technology, Cambridge, MA (US)

(72) Inventor: Rachel E. Learned, Waltham, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 163 days.

(21) Appl. No.: 16/880,370

(22) Filed: May 21, 2020

Related U.S. Application Data

(60) Provisional application No. 62/850,730, filed on May 21, 2019.

(51) Int. Cl.
| | | |
|---|---|---|
| H04L 25/38 | (2006.01) | |
| H04B 7/08 | (2006.01) | |
| H04W 72/08 | (2009.01) | |
| H04L 1/00 | (2006.01) | |
| H04L 25/02 | (2006.01) | |
| H04B 1/7103 | (2011.01) | |

(52) U.S. Cl.
CPC ........... *H04B 7/086* (2013.01); *H04B 1/7103* (2013.01); *H04L 1/0048* (2013.01); *H04L 25/0204* (2013.01); *H04W 72/082* (2013.01)

(58) Field of Classification Search
USPC ...................................................... 369/44.28
See application file for complete search history.

(56) References Cited

U.S. PATENT DOCUMENTS 6,018,317 A * 1/2000 Dogan ................. H04B 7/0857
  342/373
6,487,414 B1  11/2002 Tanay et al.
6,701,129 B1  3/2004 Hashem et al.
  (Continued)

FOREIGN PATENT DOCUMENTS

WO   WO 2010/066289 A1    6/2010
WO   WO 2011/006116 A1    1/2011
  (Continued)

OTHER PUBLICATIONS

Helmi Chaouech et al (Multiuser Detection in Asynchronous Multibeam Communications, International Journal of Wireless & Mobile Networks (IJWMN) vol. 4, No. 1, Feb. 2012 National Engineering School of Tunis, University of El-Manar, Tunis, Tunisia, pp. 21-34).*
  (Continued)

*Primary Examiner* — Helene E Tayong
(74) *Attorney, Agent, or Firm* — Daly, Crowley, Mofford & Durkee, LLP

(57) ABSTRACT

In some embodiments, a method for mitigating interference in a channel having multiple users can include: determining a starting angle based on a direction of a signal of interest (SOI); iteratively steering a beam away from the starting angle in opposite directions and calculating a grade of the beam; choosing the beam at a current angle as a receive beam based on the beam grade; receiving a signal using the receive beam; and decoding the SOI from one or more interfering signals using successive interference cancellation multi-user detection (SIC MUD) on the received signal.

18 Claims, 10 Drawing Sheets

(56) References Cited

U.S. PATENT DOCUMENTS

| | | | |
|---|---|---|---|
| 6,704,376 | B2 | 3/2004 | Mills et al. |
| 6,947,505 | B2 | 9/2005 | Learned |
| 7,031,266 | B1 | 4/2006 | Patel et al. |
| 7,058,422 | B2 | 6/2006 | Learned et al. |
| 7,085,575 | B2 | 8/2006 | Fabien et al. |
| 7,092,452 | B2 | 8/2006 | Taylor et al. |
| 7,126,890 | B2 | 10/2006 | Learned et al. |
| 7,190,743 | B2 | 3/2007 | Learned |
| 7,218,690 | B2 | 5/2007 | Learned |
| 7,269,223 | B2 | 9/2007 | Learned et al. |
| 7,558,238 | B1 | 7/2009 | Sun et al. |
| 7,593,473 | B2 | 9/2009 | Learned et al. |
| 7,593,492 | B1 | 9/2009 | Lande et al. |
| 7,724,851 | B2 | 5/2010 | Learned et al. |
| 7,738,906 | B2 | 6/2010 | Attar et al. |
| 9,148,804 | B2 | 9/2015 | Learned |
| 9,998,199 | B2 * | 6/2018 | Learned .................. H04B 7/086 |
| 10,091,798 | B2 | 10/2018 | Learned et al. |
| 10,225,112 | B1 | 3/2019 | Doane |
| 11,005,507 | B2 | 5/2021 | Dowling |
| 11,194,005 | B2 * | 12/2021 | Reisenfeld ................. G01S 3/72 |
| 2001/0028675 | A1 | 10/2001 | Bierly et al. |
| 2002/0002052 | A1 | 1/2002 | McHenry |
| 2002/0122413 | A1 | 9/2002 | Shoemake |
| 2002/0181637 | A1 | 12/2002 | Nakabayashi |
| 2003/0043071 | A1 | 3/2003 | Lilly et al. |
| 2004/0018843 | A1 | 1/2004 | Cerwall et al. |
| 2004/0082363 | A1 | 4/2004 | Hosein |
| 2004/0235472 | A1 | 11/2004 | Fujishima et al. |
| 2005/0124347 | A1 | 6/2005 | Hosein |
| 2005/0201280 | A1 | 9/2005 | Lundby et al. |
| 2007/0086379 | A1 | 4/2007 | Takayanagi et al. |
| 2008/0089279 | A1 | 4/2008 | Hu et al. |
| 2008/0198828 | A1 | 8/2008 | Reznik et al. |
| 2008/0293353 | A1 | 11/2008 | Mody et al. |
| 2009/0154534 | A1 | 6/2009 | Hassan |
| 2009/0190566 | A1 | 7/2009 | Kwon et al. |
| 2009/0258597 | A1 | 10/2009 | Chen et al. |
| 2010/0124930 | A1 | 5/2010 | Andrews et al. |
| 2010/0142465 | A1 | 6/2010 | Medepalli et al. |
| 2010/0165956 | A1 | 7/2010 | Razzell |
| 2010/0289688 | A1 | 11/2010 | Sherman et al. |
| 2010/0304770 | A1 | 12/2010 | Wietfeldt et al. |
| 2011/0021153 | A1 * | 1/2011 | Safavi .................. H04J 11/0023 |
| | | | 455/63.1 |
| 2011/0093540 | A1 | 4/2011 | Eisenberg et al. |
| 2011/0176508 | A1 | 7/2011 | Altintas et al. |
| 2011/0286351 | A1 | 11/2011 | Reudink |
| 2012/0039183 | A1 | 2/2012 | Barbieri et al. |
| 2012/0069941 | A1 | 3/2012 | Herbig |
| 2012/0071102 | A1 | 3/2012 | Palomar et al. |
| 2012/0108276 | A1 | 5/2012 | Lang et al. |
| 2012/0208571 | A1 | 8/2012 | Park et al. |
| 2013/0035108 | A1 | 2/2013 | Joslyn et al. |
| 2013/0089021 | A1 | 4/2013 | Gaal et al. |
| 2013/0244681 | A1 | 9/2013 | Ookubo et al. |
| 2014/0126488 | A1 | 5/2014 | Learned |
| 2014/0293867 | A1 | 10/2014 | Horiuchi et al. |
| 2014/0314003 | A1 | 10/2014 | Zhou et al. |
| 2014/0348004 | A1 | 11/2014 | Ponnuswamy |
| 2015/0049721 | A1 | 2/2015 | Wijting et al. |
| 2015/0089048 | A1 | 3/2015 | Jackson et al. |
| 2015/0282176 | A1 | 10/2015 | MacLeod et al. |
| 2015/0282189 | A1 | 10/2015 | Learned et al. |
| 2018/0309502 | A1 | 10/2018 | Khandani |
| 2019/0075438 | A1 | 3/2019 | Kuo et al. |
| 2019/0222296 | A1 | 7/2019 | Khandani |
| 2020/0336168 | A1 | 10/2020 | Hormis et al. |
| 2020/0395686 | A1 | 12/2020 | Jamin et al. |

FOREIGN PATENT DOCUMENTS

| | | |
|---|---|---|
| WO | WO 2011/055319 A1 | 5/2011 |
| WO | WO 2013/185150 A1 | 12/2013 |
| WO | WO 2014/052992 A1 | 4/2014 |
| WO | WO 2016/053406 A1 | 4/2016 |
| WO | WO 2016/053406 A9 | 4/2016 |
| WO | WO 2016/114844 A2 | 7/2016 |

OTHER PUBLICATIONS

Ahmed, et al.; "Entropy Expressions and Their Estimators for Multivariate Distributions;" IEEE Transactions on Information Theory; vol. 35; No. 3; May 1989; 5 pages.

Bahl, et al.; "Optimal Decoding of Linear Codes for Minimizing Symbol Error Rate;" IEEE Transactions on Information Theory; Mar. 1974; 4 pages.

Learned; "Making Optimal Use of the Asymmetric Inference Channel;" IEEE; Signals, Systems and Computers (Asilomar); Nov. 6-9, 2011; 6 pages.

Learned; "Making Optimal Use of the Asymmetric Interference Channel;" Asilomar Conference on Signals, Systems, and Computing; Presentation; Nov. 8, 2011; 63 pages.

Neeser, et al.; "Proper Complex Random Processes with Applications to Information Theory;" IEEE Transactions on Information Theory; vol. 39; No. 4; Jul. 1993; 10 pages.

Pham; "Fast Algorithms for Mutual Information Based Independent Component Analysis;" IEEE Transactions on Signal Processing; vol. 52; No. 10; Oct. 2004; 11 pages.

Tufts; "Design Problems in Pulse Transmission;" Technical Report 368; Massachusetts Institute of Technology; Jul. 28, 1960; 52 pages.

Tufts; "Nyquist's Problem—The Joint Optimization of Transmitter and Receiver in Pulse Amplitude Modulation;" Proceedings of the IEEE: vol. 53; Issue 3; 12 pages.

Ungerboeck; "Channel Coding with Multilevel/Phase Signals;" IEEE Transactions on Information Theory; vol. IT-28; No. 1; Jan. 1982; 13 pages.

Verdu; "The Capacity Region of the Symbol-Asynchronous Gaussian Multiple-Access Chanel;" IEEE Transactions on Information Theory; vol. 35; No. 4; Jul. 1989; 19 pages.

U.S. Appl. No. 16/900,116, filed Jun. 12, 2020, Dowling.

U.S. Appl. No. 16/880,410, filed May 21, 2020, Learned.

U.S. Appl. No. 16/880,377, filed May 21, 2020, Learned.

Notice of Allowance dated Jan. 11, 2021 for U.S. Appl. No. 16/900,116; 15 pages.

Non-Final Office Action dated Feb. 9, 2022 for U.S. Appl. No. 16/880,377; 13 Pages.

Non-Final Office Action dated Aug. 25, 2022, for U.S. Appl. No. 16/880,410; 9 Pages.

Response filed Jun. 1, 2022 to Non-Final Office Action dated Feb. 9, 2022 for U.S. Appl. No. 16/880,377; 9 Pages.

Final Office Action dated Jun. 27, 2022 for U.S. Appl. No. 16/880,377; 18 Pages.

Response to U.S. Office Action dated Jun. 27, 2022 for U.S. Appl. No. 16/880,377; Response filed Sep. 27, 2022; 8 pages.

Advisory Action with Examiner Interview Summary and AFCP Decision dated Oct. 14, 2022 for U.S. Appl. No. 16/880,377; 5 pages.

Response to U.S. Office Action dated Aug. 25, 2022 for U.S. Appl. No. 16/880,410; Response filed Nov. 21, 2022; 12 pages.

U.S. Notice of Allowance dated Feb. 17, 2023 for U.S. Appl. No. 16/880,410; 11 pages.

U.S. Notice of Allowance dated Feb. 16, 2023 for U.S. Appl. No. 16/880,377; 9 pages.

\* cited by examiner

METHOD AND APPARATUS FOR DETERMINING A RECEIVER BEAM IN A CO-EXISTENCE COGNITIVE RADIO

CROSS-REFERENCE TO RELATED APPLICATIONS

This application claims the benefit under 35 U.S.C. § 119 of provisional patent application No. 62/850,730 filed May 21, 2019, which is hereby incorporated by reference herein in its entirety.

STATEMENT REGARDING FEDERALLY SPONSORED RESEARCH

This invention was made with government support under FA8702-15-D-0001 awarded by the U.S. Air Force. The government has certain rights in the invention.

FIELD

The disclosure pertains generally to wireless communication, and more particularly to cognitive radio systems and techniques for achieving ad hoc wireless communications in the presence of other user interference (sometime referred to herein as "interference multiple access wireless communications").

BACKGROUND

As is known in the art, multiuser detection algorithms are increasingly being considered for wireless communication systems to allow multiple transmitters to "collide" in the RF medium as viewed by the receivers for which these transmissions are targeted. In other words, multiuser detection receivers allow transmitters to be allocated the same frequency band at the same time and/or to allow collisions to occur in a packet-based multiple access wireless communication protocol.

In many cases, the addition of the multiuser detector in the receiver, along with a medium access control scheme or other protocol rules will enable such a co-channel interference tolerant radio to work. However, the quality of service (QoS) is difficult to maintain in this new paradigm of interference multiple access (IMA) when the distances between transmitters and receivers and/or the channel quality is dynamically changing. The underlying issues associated with these difficulties are a mix of both familiar problems (similar to those we understand well from typical, main stream, collision avoidance communication systems) as well as those that are unique only to IMA.

One unique problem of IMA receivers occurs when the dynamic range between the interfering signals is very large. In theory, MUD receivers should work extremely well in such a situation because even the simplest suboptimal MUD algorithm can take advantage of the inefficient high power signal. Specifically, in many situations, the high power interfering signal's rate is very low compared to its capacity potential rate based upon its very high, received power. In such a case, this high power signal can, in theory, be detected, recreated, and stripped off to reveal the low power signal underneath.

In an actual system, such as the generic state of the art MUD receiver shown in FIG. 1, the received signal, before it is fed to the MUD processing algorithm, must be collected by the receiver front end. In the receiver front end, comprised of lines and units labeled 340-750 in the figure, the signal power must be adjusted so as not to saturate the receiver. This is done by automatic gain control (AGC) unit 600. After the signal's power is reduced by the AGC, it is sampled by an analog-to-digital converter (A/D) unit 700. The A/D converter unit 700 turns the analog signal into a series of numbers or samples output on line 750. Each of these samples is represented as a block of bits (ones and zeros), where the number of bits in each block used to represent the value of a single sample has been pre-determined and is limited, typically to 8 bits per sample (bps), 12 bps, or 16 bps.

In addition to the AGC and A/D operations, the processing that is done within the parameter estimation unit 800 and the MUD processing unit 900 is done with a limited precision on the number of bits per value. This is known in the art of hardware implementations of processing algorithms as fixed precision arithmetic. It is the combination of the AGC, A/D, and fixed precision arithmetic that causes a significant noise-like effect to be applied to the lower power signal.

FIG. 2 is a diagram illustrating a network scenario in which two nodes (node a and node b) endeavor to communicate with one another using a channel that is already in use by two other nodes (node A and node B). Nodes A and B may be communicating with one another at a relatively high power level and nodes a and b may desire to communicate at a much lower power level. As shown, at a particular point in time, node b may receive two signals, a higher power signal received from node A and a lower power signal received from node a. These signals are effectively added together at the receive antenna of node b. The signal from node A represents an interference signal at node b (i.e., an unwanted signal) and the signal from node a is the desired signal. This is one example of a situation where a nearby transmitter might overpower other local communications. Another example might occur in a system where power control is not possible, and where distances could be small or great between transmitting and receiving nodes, and could change over time depending upon parameters such as changing location of transmitters and/or receivers, as well as changes in the destination node(s) for each packet transmission.

If the two signals received at node b are many orders of magnitude different in received power (e.g., greater than 30 dB apart), then the combined effect of the AGC and the A/D can result in the lower of the two signals being "buried" in the combination of receiver noise and a noise-like result that happens when coarse quantization is applied during the sampling process.

Specifically, the received signal at node b may be modeled as coming from four different sources: r=s+n1+n2+n3, where s is the signal of interest and n1 is energy from other signals in the environment. Both s and n1 are present at the antenna. The other two noise terms are n2, the receiver analog noise, and n3, the receiver A/D digitization noise. The environment noise, n1, is pushed down by the AGC along with the received signal, s. The other two terms, n2 and n3, are not pushed down by the AGC. Since the AGC is upfront in the receiver chain, n2 includes impacts from the tuner and filters of the receiver. If the receiver has several stages of downconversion (e.g., one or more IF downconversion stages), there will be multiple iterations of tuners/filters, all of which contribute to n2. This means that even if the lower power signal (signal a) were received at the antenna with enough power to be successfully demodulated in the absence of the higher power signal (signal A), once it is combined with the higher power signal, the AGC will push down the total received signal power to a point where the power level of the lower power signal is dramatically lower than its received level. Even if the higher power signal could be stripped off perfectly from this post AGC signal, the rate of the information attempting to be conveyed by the lower power signal will likely be too high compared to the capacity rate dictated by the actual (post-AGC) received signal to noise ratio (SNR) of this signal.

It is possible that the effect of the AGC is not so severe as to cause the received SNR of the lower signal to be too low relative to its rate. In this case, the noise term that will have the most effect is n3, the noise that models the effect of signal quantization. Specifically, after the lower power signal has been reduced in received power by the AGC process, there may simply not be enough bits per sample to represent the small variations that are due only to the lower power of the two interfering signals. Furthermore, the processing that is performed as part of the MUD algorithm must be implemented with limited precision arithmetic. The limited precision adds yet another effect that would not cause a problem if the signals were closer in received power, but that will cause a very noticeable and detrimental effect on the lower power signal when their dynamic range (the difference between the two signal's received powers) is many orders of magnitude.

There are two conventional alternatives to using a MUD receiver to solve the interference problem. The first is to use error correction coding, treating the interference as noise. Even without the effect of the AGC-plus-A/D described above, for cases of high power interference, treating the interference as unstructured noise will result in a very low SNR for the signal of interest, which leads to a extremely low rate link. When we add the effect of the AGC-plus-A/D which pushes the lower power signal of interest even lower, down into the noise, link closure, even at very low rates, is no longer possible.

The second alternative in this case is to use the spatial diversity that typically exists among interfering signals. It is very common in commercial wireless systems for the interfering transmitters to be located at different angles of arrival as seen by the receiver. If the receiver is equipped with multiple antennas, as shown in FIG. 3, the receiver could employ any number of digital beamforming algorithms to direct a strong beam toward one of the transmitters and to direct very deep nulls toward the other transmitters.

This digital beamform-only solution requires high-cost technology, and sometimes high computational complexity for needed processing algorithms, hardware devoted to the beamforming processing, as well as multiple antennas and the corresponding receiver ports. In addition, to attempt to provide sufficient quality of service under many typical conditions, the number of antenna elements needs to be greater than the total number of anticipated interfering transmitters. This is unrealistic for most size/weight/power requirements of most wireless communication receivers. Even with all these necessary components, there are still many cases in which the signals are not spatially separable to the level required for reliable communication. Moreover, the limited dynamic range issue is still present in conventional state of the art digital beamforming approaches, such as illustrated in FIG. 3.

A much lighter and cheaper, but less effective, solution could be built with as few as two receive antennas and by using analog beamforming instead of digital beamforming. Such a receiver would provide some capability in adjusting the received powers of interfering signals, but alone, would almost always suffer unreliable links due to the unsuppressed co-channel interference.

SUMMARY

The concepts, systems, circuits, and techniques described herein can make use of cheaper, lighter, less capable analog beamforming technology to address problems caused by an AGC, A/D, and/or fixed precision arithmetic that can leave a MUD severely crippled or even inoperable in a high dynamic range scenario.

In order to accomplish reliable reception of interfering signals in changing environments that are typical of those experienced by commercial wireless systems, the concepts, systems, circuits, and techniques described herein may rely upon an ability of the receiver to sense and characterize the situation that it faces as well as to provide a cognitive ability to intelligently and automatically (e.g., without input from a human) control the receiver parameters to result in a receive beam being chosen that increases the likelihood of success of the MUD processing for any given situation as it occurs.

The concepts, systems, circuits, and techniques described herein find use in a wide variety of application areas including, but not limited to, wireless communication such as that provided by the 4G (LTE) cellular, IEEE 802.11 (Wi-Fi), or IEEE 802.16 (WiMAX) wireless standards and equipment.

The concepts, systems, circuits, and techniques described herein allow different wireless networks and/or radios to co-exist in the same frequency band at the same time, causing interference with one another (i.e., they can interfere on purpose) and the concepts, systems, circuits, and techniques described herein can help alleviate the spectrum congestion problem that plagues commercial wireless systems.

It should thus be appreciated that, in general, the concepts, systems, circuits, and techniques described herein may find use in any application in which it is necessary or desirable to allow different signals to propagate in a manner such that the signals interfere with one another. The concepts, systems, circuits, and techniques described herein can be used to receive such interfering signals and process the interfering signals to provide a useful result (e.g., the ability to increase an amount of information transmitted or otherwise exchanged between two points (a source and a destination) over a band limited channel or transmission media).

In one exemplary application, the concepts, systems, and techniques described herein allow different wireless networks and/or radios to co-exist in the same frequency band at the same time, causing interference with one another (i.e., the networks/radios, etc., will interfere on purpose) without different providers and mobile nodes having to conform to a single waveform or coordination-enabling protocol. The different interfering networks/systems do not require pre-specified coordination/cooperation protocols or means of direct communication with each other to negotiate a satisfactory sharing of the same band.

The concepts, systems, circuits, and techniques described herein may enable backward compatible operation with radios that do not possess the capabilities of the novel concepts, systems and techniques, where conventional radios would maintain high functionality in the presence of the impeded "spectrum share."

According to one aspect of the present disclosure, a method for mitigating interference in a channel having multiple users can include: determining a starting angle based on a direction of a signal of interest (SOI); iteratively steering a beam away from the starting angle in opposite directions and calculating a grade of the beam; choosing the beam at a current angle as a receive beam based on the beam grade; receiving a signal using the receive beam; and decoding the SOI from one or more interfering signals using successive interference cancellation multi-user detection (SIC MUD) on the received signal.

In some embodiments, determining the starting angle can include determining the starting angle as an estimated direction of arrival (DOA) of the SOI. In some embodiments, determining the starting angle can include: estimating a DOA of the SOI; estimating a DOA of an interfering channel; and determining the starting angle as an angle halfway between the estimated DOA of the SOI and the estimating DOA of the interfering channel. In some embodiments, determining the starting angle can include using an adaptive interference nulling technique.

In some embodiments, choosing the beam at the current angle as the receive beam can include determining that the beam grade exceeds a predetermined beam grade threshold. In some embodiments, the method can include determining a grade of the receive beam based on a detection score for the SOI. In some embodiments, determining the grade of the receive beam can include estimating an interference to signal-plus-noise-power ratio (ISNR) of the received signal and determining if the ISNR of the received signal is outside of a predetermined ISNR range. In some embodiments, the method can include determining grades of multiple beams in parallel.

In some embodiments, receiving the signal using the receive beam can include receiving the signal using a digital beamformer. In some embodiments, receiving the signal using the receive beam comprises receiving the signal using an analog beamformer.

BRIEF DESCRIPTION OF THE DRAWINGS

The manner of making and using the disclosed subject matter may be appreciated by reference to the detailed description in connection with the drawings, in which like reference numerals identify like elements.

Figure 1:
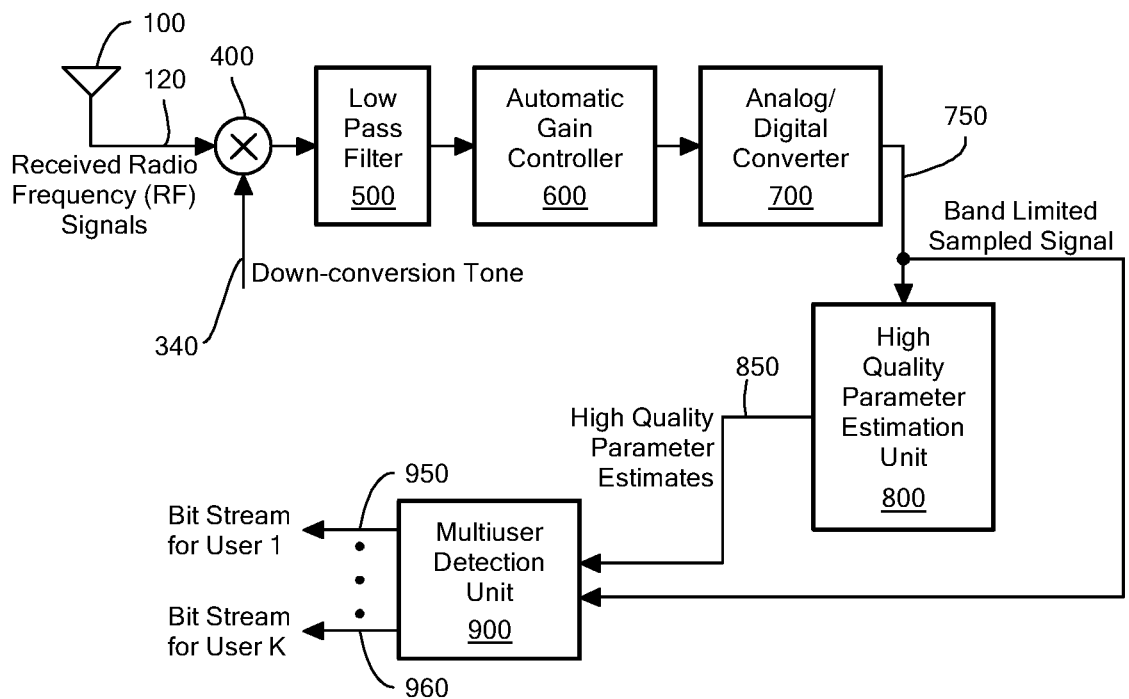
FIG. 1 is a block diagram illustrating a conventional MUD receiver arrangement.

The drawings are not necessarily to scale, or inclusive of all elements of a system, emphasis instead generally being placed upon illustrating the concepts, structures, and techniques sought to be protected herein.

DETAILED DESCRIPTION

Before describing a coexistence cognitive radio (CECR) and related methods, some introductory concepts and terminology are explained. As an initial matter, it should be appreciated that the concepts, systems, and techniques described herein find use in a wide variety of application areas.

For example, the concepts, systems, and techniques described herein for processing and/or making use of interfering signals find application in a wide variety of application areas including, but not limited to: magnetic storage media, magnetic storage systems, signal propagation systems (e.g., systems including cable or other physical transmission media), wireless networks or systems (e.g., wireless medical systems, satellite communications (SATCOM) systems, optical communications systems, wireless networking systems, wireless cellular systems, and/or others), and wired communications systems (e.g., communications over a cable or other type of wire or conductor).

The above notwithstanding, to promote clarity and understanding, the broad concepts, systems, and techniques of the present disclosure are discussed below in the context of a wireless communication system. This is not intended to be limiting and should not be construed as such. That is, as described above, the broad concepts described herein apply to a wide variety of different fields of use.

Communicating data from one location to another requires some form of pathway or medium between the two locations. In telecommunications and computer networking, a communication channel, or more simply "a channel," refers to a connection between two locations over a transmission medium. The connection may, for example, be a logical connection and the transmission medium may be, for example, a multiplexed medium such as a radio channel. A channel is used to convey an information signal (e.g., a digital bit stream, etc.) from one or more source or sending nodes (or, more simply, "sources" or "transmitters") to one or more destination or receiving nodes (or, more simply, "destinations" or "receivers"). Regardless of the particular manner or technique used to establish a channel, each channel has a certain capacity for transmitting information, often measured by its frequency or bandwidth in Hertz or its data rate in bits per second.

A coexistence cognitive radio (CECR) and related techniques as described herein are capable of assessing a frequency spectrum, determining candidate bands in which other independent radios are already operating, and successfully sharing access of an already occupied frequency band with an independent radio system. CECRs may successfully transmit and receive in a pre-occupied band without prohibiting the operation of a pre-existing radio system that was already operating in that band. Moreover, the pre-existing radio system already operating in that band requires no additional capabilities to co-exist with the subject CECR system. Specifically, the pre-existing radio system is not expected to communicate with the coexistence cognitive radio to accomplish the virtual negotiation to settle upon an agreeable coexistence of the two systems.

Figure 4:
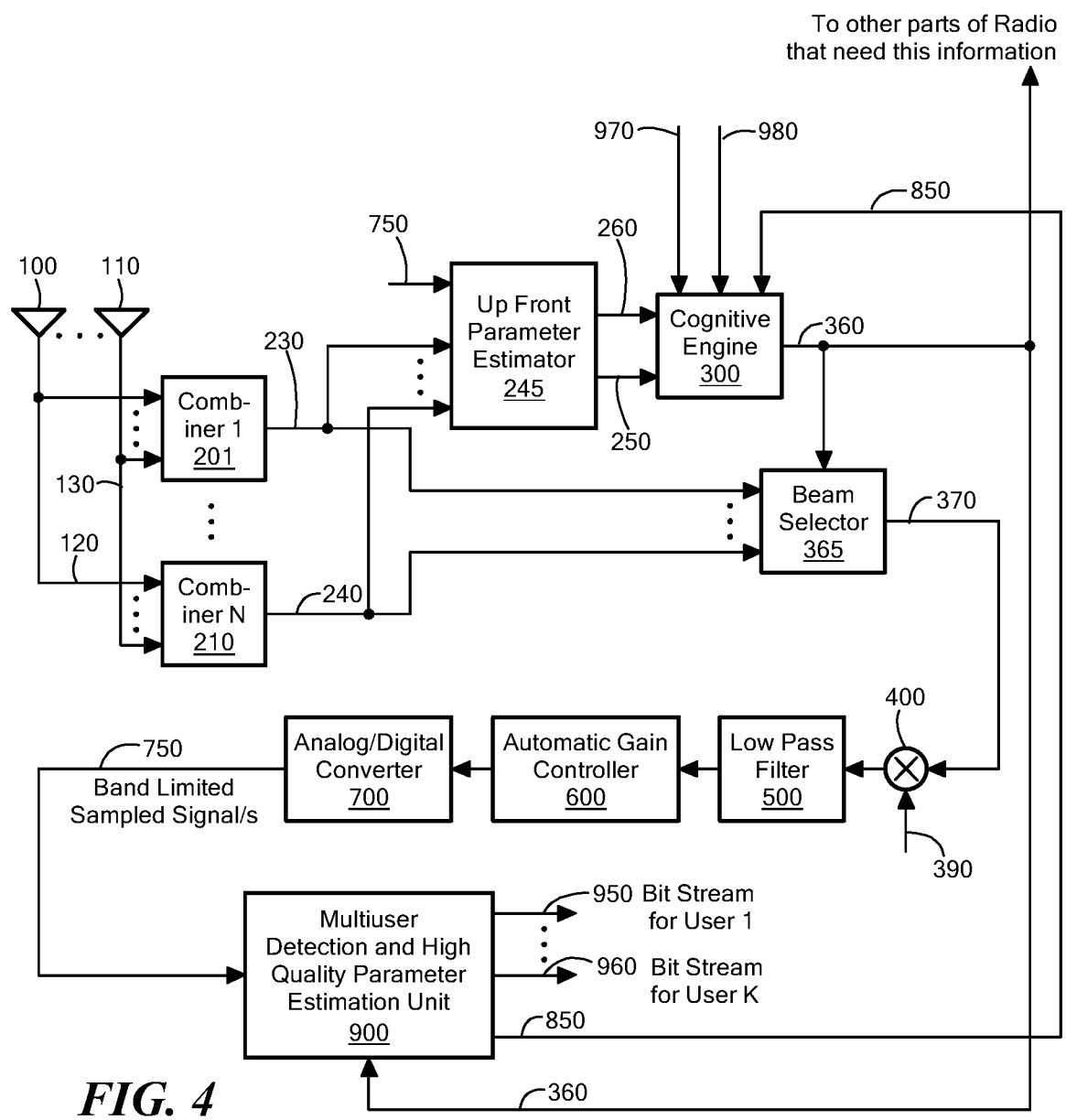
FIG. 4 is a block diagram illustrating an exemplary receiver in accordance with an embodiment.

FIG. 4 is a block diagram illustrating an exemplary receiver in accordance with an embodiment. The receiver of FIG. 4 may be part of, for example, a coexistence cognitive radio (CECR) or other radio system. As shown, multiple antennas 100, 110 supply signals 120, 130 to a set of fixed linear combiners 201, 210 which may serve as beamformers. Combiner outputs 230, 240 are passed to an up front signal parameter estimation unit 245. Estimation unit 245 computes a list of SNR's for each signal in each beam and passes this information to a cognitive engine 300 along line 250. Estimation unit 245 may also compute low quality signal parameter estimates, such as the number of coexisting signals, baud rates and baud timing, carrier offsets, modulation schemes, etc. These low quality parameter estimates are passed to the cognitive engine 300 along line 260. The cognitive engine 300 may also receive quality of service (QoS) information and relevant waveform parameters on input line 970, information on one or more MUD algorithm types implemented in the receiver on input line 980, and high quality parameter estimates for current beams (if available) on input line 850. The cognitive engine 300 evaluates all options given the available information and provides a decision as to which beam or beams to use (e.g., a single combiner output if the MUD is a single-beam MUD, a set of beams if the MUD is a multi-beam iterative MUD, etc.). A combiner list may be output to the beam selector unit 365 along line 360. The chosen combiner output(s) are passed along line 370 for conventional down conversion and baseband sampling in mixer 400, low pass filter (LPF) 500, automatic gain controller (AGC) 600, and analog to digital (A/D) converter 700. The particular combiner (or combiners) chosen may be one (or a set) that exhibits favorable dynamic range(s) for the signals of interest, so that the MUD algorithm performs favorably.

The cognitive engine 300 receives input as available from other units within the receiver. The most rudimentary functioning of this unit is possible with no more than the list of SNR's for each signal for each beam as provided by the up front signal parameter estimation unit 245, the type of MUD implemented in the receiver as provided on line 980, and either an estimated modulation rate and, if possible, an error correction coding rate from line 260 or a known modulation and, if known, a coding rate from line 970. For some state of the art radios, means other than up front signal parameter estimation unit 245 may be used to provide the low quality signal parameter estimates to cognitive engine 300.

If more information is available, such as quality of service measurements on line 970, the cognitive engine 300 may be capable of improved decision making. Further, if available, the cognitive engine 300 may be capable of high quality refinements using the high quality signal parameters on line 850 that would be a by-product of the MUD processing within unit 900.

Figure 5:
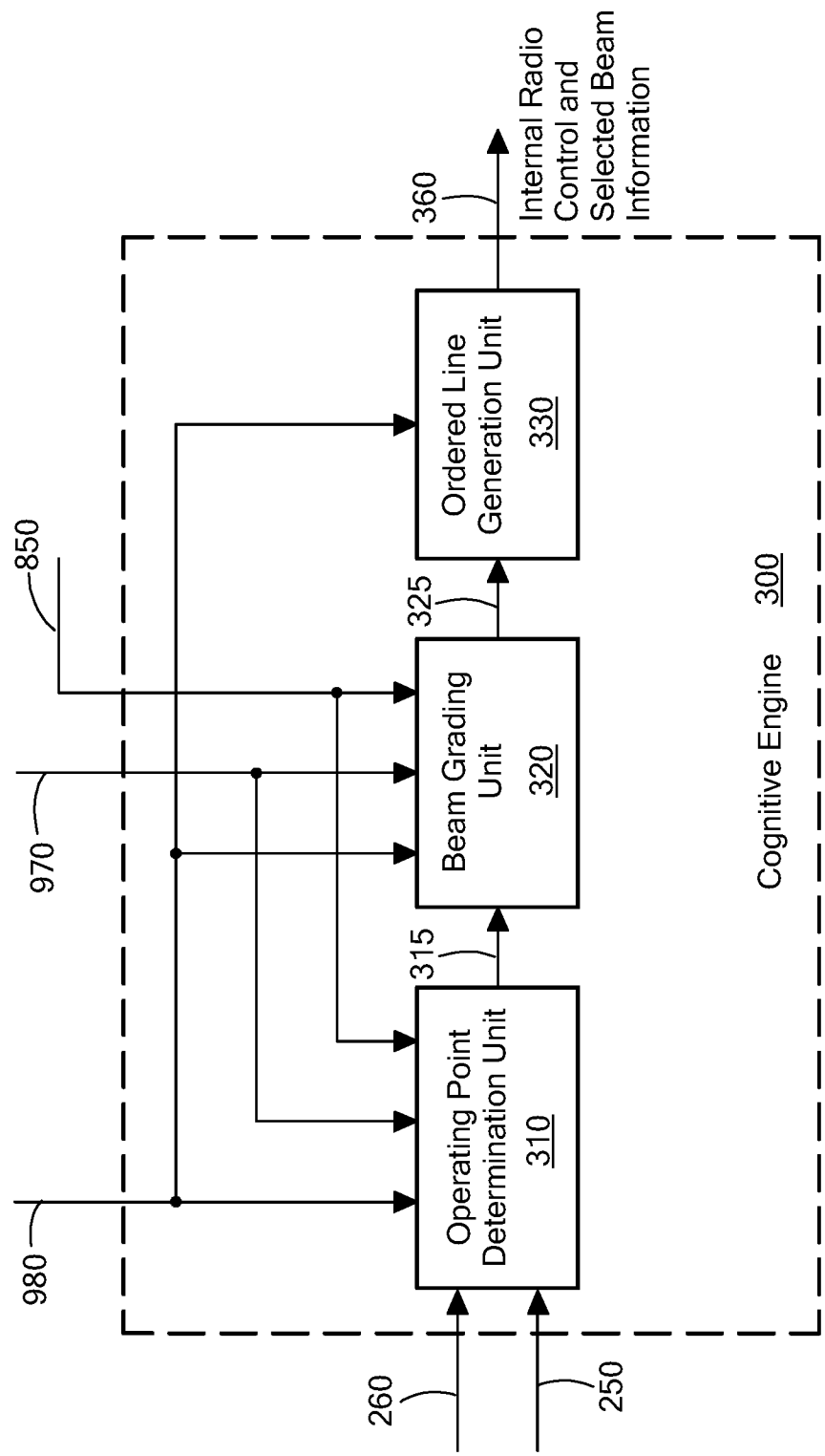
FIG. 5 is a block diagram illustrating functionality within an exemplary cognitive engine in accordance with an embodiment.

FIG. 5 is a block diagram illustrating functionality within an exemplary cognitive engine 300 in accordance with an embodiment. As shown, cognitive engine 300 may include: an operating point determination unit 310, a beam grading unit 320, and an ordered beam list generation unit 330. The operating point determination unit 310 determines the current operating point. The operating point, which is output by unit 310 along line 315, is defined by the rates of all the signals "seen" by the receiver as well as the MUD algorithm that has been implemented within the receiver. The beam grading unit 320 performs a test to determine if an operating point is feasible for each possible beam or combination of beams under consideration. If it is feasible, this unit then computes a grade that scores the level of "goodness" of this beam or combination of beams for the MUD processing that will be performed. If the operating point is not feasible, the beam grading unit provides the lowest possible grade for that beam or combination of beams for the given operating point. The list of graded beams or combination of beams is output along line 325. The ordered beam list generation unit 330 puts the list of beams or beam combinations in the order that should be used by a beam-recursive MUD, if a beam-recursive MUD is to be used. Note that the list for a beam-recursive MUD is not a simple grade-ordered list. If a non-beam-recursive MUD is to be used, then a grade-ordered list still may be provided along line 360, but only the beam or combination of beams with the highest grade will be used. Unit 320 could implement any appropriate evaluation algorithm for determining the probability of success or similar metric for a given multiuser detector operating on a specific set of interfering signals as "seen" via a single beam MUD, multi-spatial MUD acting on a combination of beams, or when processed with a beam-recursive MUD. One suitable method and apparatus for use as unit 320 is described in PCT Patent Application No. PCT/US2013/031900 entitled "Method And Apparatus For Rate Determination In A Radio Frequency System."

Figure 2:
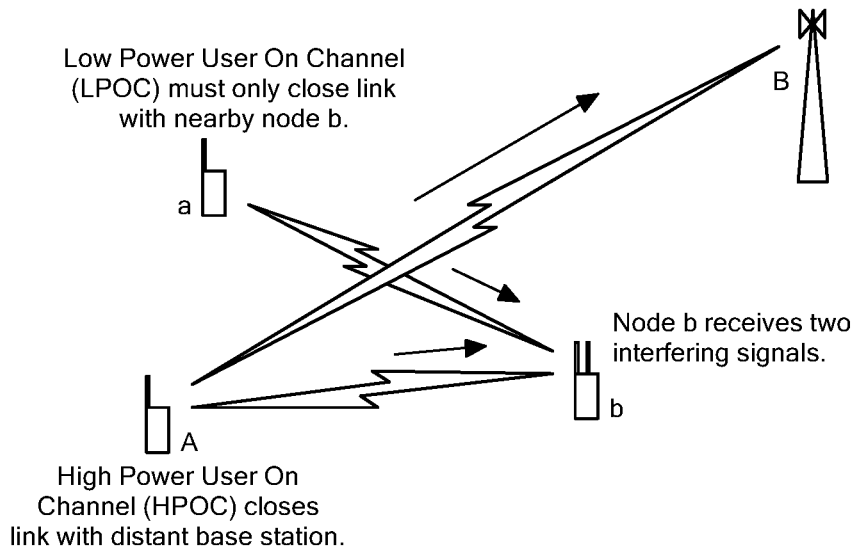
FIG. 2 is a diagram of a network scenario in which a pair of nodes that endeavor to use the same channel as is already in use communicate. This pair is called the second-user-on-channel (SUOC).
Figure 3:
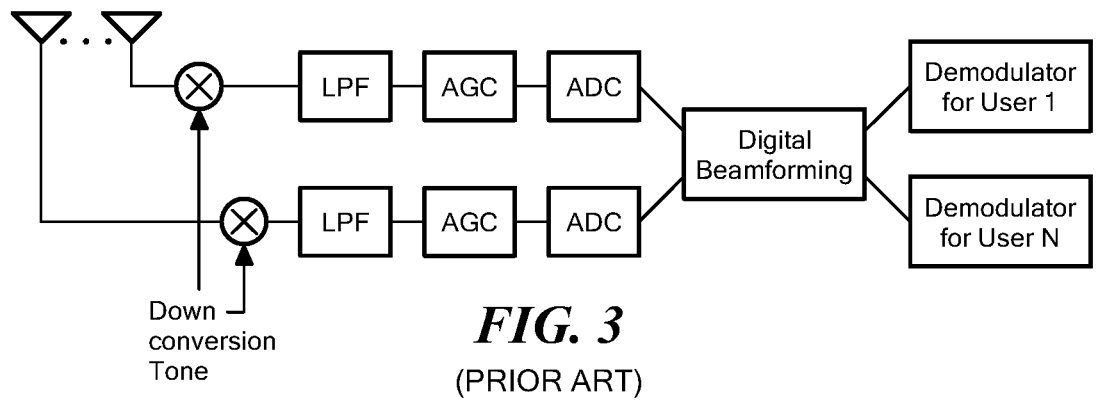
FIG. 3 is a block diagram illustrating a receiver arrangement that uses multiple antennas and digital beamforming to direct a strong beam toward one of two transmitters and a strong null toward the other.

As will be described in greater detail, in at least one embodiment, the receiver of FIG. 4 is used in a scenario where pre-existing choices have been made for both the transmit powers and modulation and coding rates for each of the transmitters that can be "heard" by a subject receiver. It should be appreciated that Node b as shown in FIG. 2 is assumed, for this exemplary instantiation, to have no control over the transmit powers or rates of the multiple signals it receives. Another approach that would enable cooperative on-the-fly autonomous adaptation of these parameters as described, for example, in U.S. application Ser. No. 61/723,639 entitled, "Cognitive Radio Method and Apparatus for Achieving Ad Hoc Interference Multiple Access Wireless Communication."

It should be noted that there are multiple modes of operation possible for the receiver of FIG. 4. There is, for example, (1) a single beam MUD mode, (2) a multiple beam non-recursive MUD mode, and (3) a multiple beam recursive MUD mode. The functionality of the multiple beam non-recursive MUD mode is a straightforward extension of the single beam MUD mode. It is known in the art that a single receiver port MUD can be extended to a multiple receiver port or multiple-beam MUD. Thus, in various embodiments described herein, if there are multiple receive antennas, it is not necessary to feed all of the signals collected on all of the antennas into the MUD. Instead, to head off the issue associated with the dynamic range problem, one or more formed beams can be fed into the MUD. If more than one beam is fed to the MUD, then it is a multi-beam or multi-spatial MUD. If only one beam is fed to the MUD, it is a single port MUD (but the MUD algorithm will be essentially the same). Each of these different MUD types may be used in the various embodiments described herein. An example of a multiple beam (or multi-spatial) non-recursive MUD is described in U.S. Pat. No. 7,724,851 to Learned et al., which is hereby incorporated by reference herein in its entirety. A beam recursive MUD could also be a multi-spatial beam recursive MUD where the first pass is with one set of beams, the second pass is with a different set of beams, and so on.

A description will now be made of the single beam mode of operation. Conventional beamforming, which is well-known and finds application in point-to-point links and MIMO systems, attempts to maximize the channel response in one direction, while greatly diminishing the response in other directions. Very sharp beams are typically desired to maximize the dynamic range between one primary signal and other secondary, undesired signals. In contrast, an approach described herein is to choose beams that reduce the dynamic range between signals. This will allow a realistic MUD algorithm to be employed wherein the multiuser capacity region or achievable rate region is favorable for the MUD that has been implemented within the receiver. In the discussion that follows, the technique will be described in the context of two signals. However, persons skilled in the art will appreciate that the techniques easily extend to greater number of signals.

Making the two signals much closer in power level (i.e., lowering dynamic range) is done at the expense of the SNR of the higher power signal. This must therefore be done carefully so that the rate for that higher power signal, after the application of the beam, is not too high relative to its "new" SNR. For example, if a dynamic range of 10 dB between signals is sufficient to eliminate the "quantization noise" caused by the combination of the automatic gain control and the A/D converter, and the normalized interference between those two signals is maximal (mathematically, the time-space received signature pulses would be nearly collinear in such a case), then it is best to work toward choosing or creating a beam to provide the desired 10 dB dynamic range because that will give the implemented MUD algorithm the best operating point. If the time-space signature pulses were less than maximally interfering, then a smaller dynamic range could be tolerated. The operating point determination unit 310 would provide appropriate evaluation regarding this trade.

In one approach, to enable the ability to reduce or alter the received dynamic range between co-channel signals, a selection may be made among multiple linear combinations of spatial waveforms. That is, a set of linear combinations of antenna data, also known as "beams", are capable of being formed. The directional response of each combination (i.e., the "beam pattern") can be either known or unknown, and either fixed or variable, in different embodiments.

Referring back to FIG. 4, in one exemplary embodiment, the multiple antennas 100, 110 supply signals to a set of fixed linear combiners 201, 210. One combiner output is chosen for conventional down conversion and baseband sampling. The particular combiner chosen is one that exhibits favorable dynamic ranges for the signals of interest, so that the MUD algorithm behaves favorably.

Figure 6:
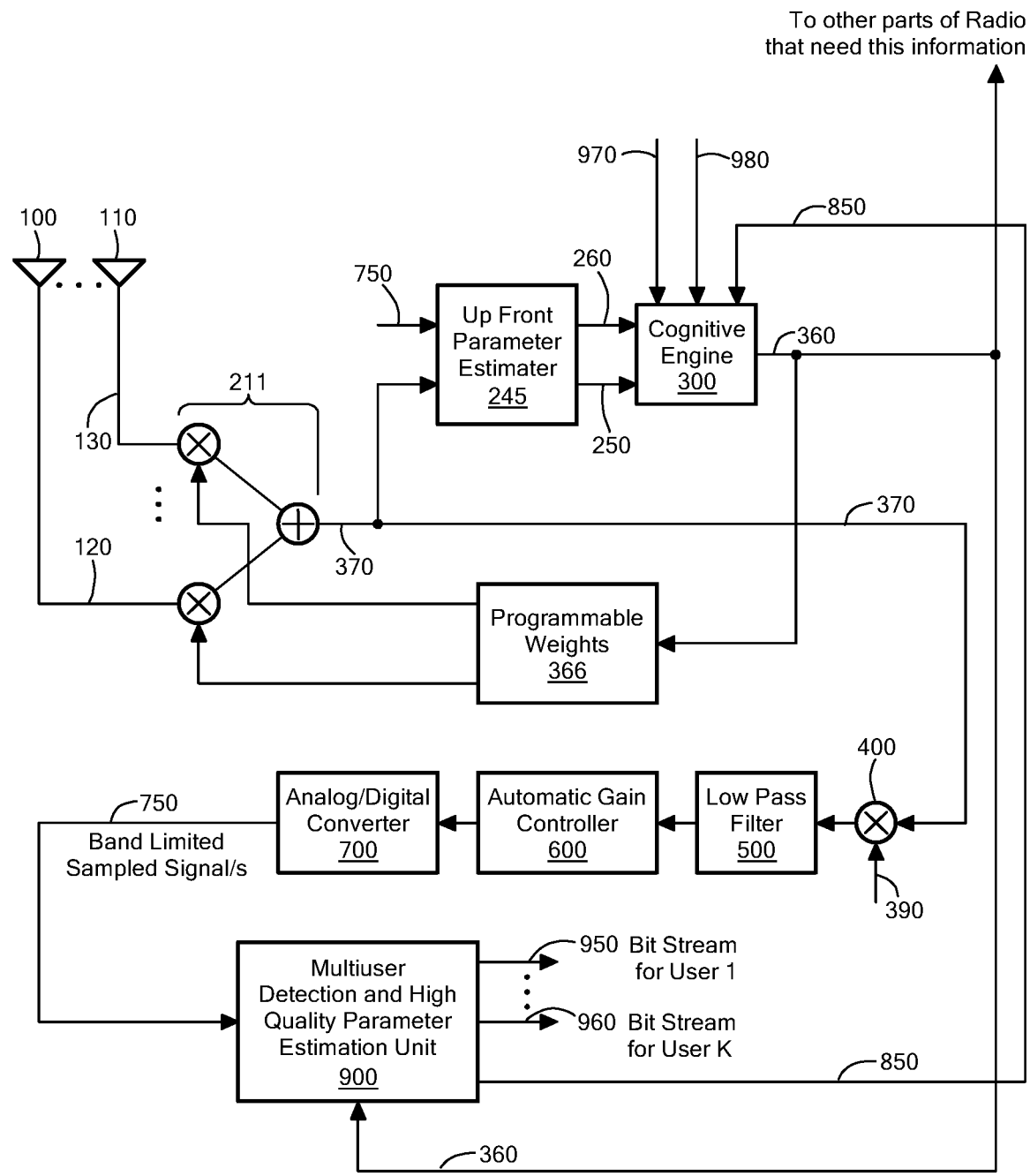
FIG. 6 is a block diagram illustrating another exemplary receiver in accordance with an embodiment.

FIG. 6 is a block diagram illustrating another exemplary receiver in accordance with an embodiment. As shown, the receiver of FIG. 6 includes a single programmable linear combiner 211. A programmable weight unit 366 is used to supply programmable weights to provide the linear weighting used by a multiply-add operation in combiner 211.

Figure 7:
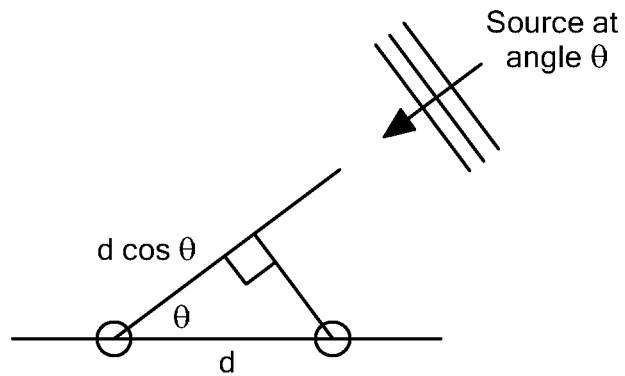
FIG. 7 is a diagram illustrating properties associated with two adjacent dipole antennas separated by a distance d that receive energy from a source at angle θ.
Figure 8:
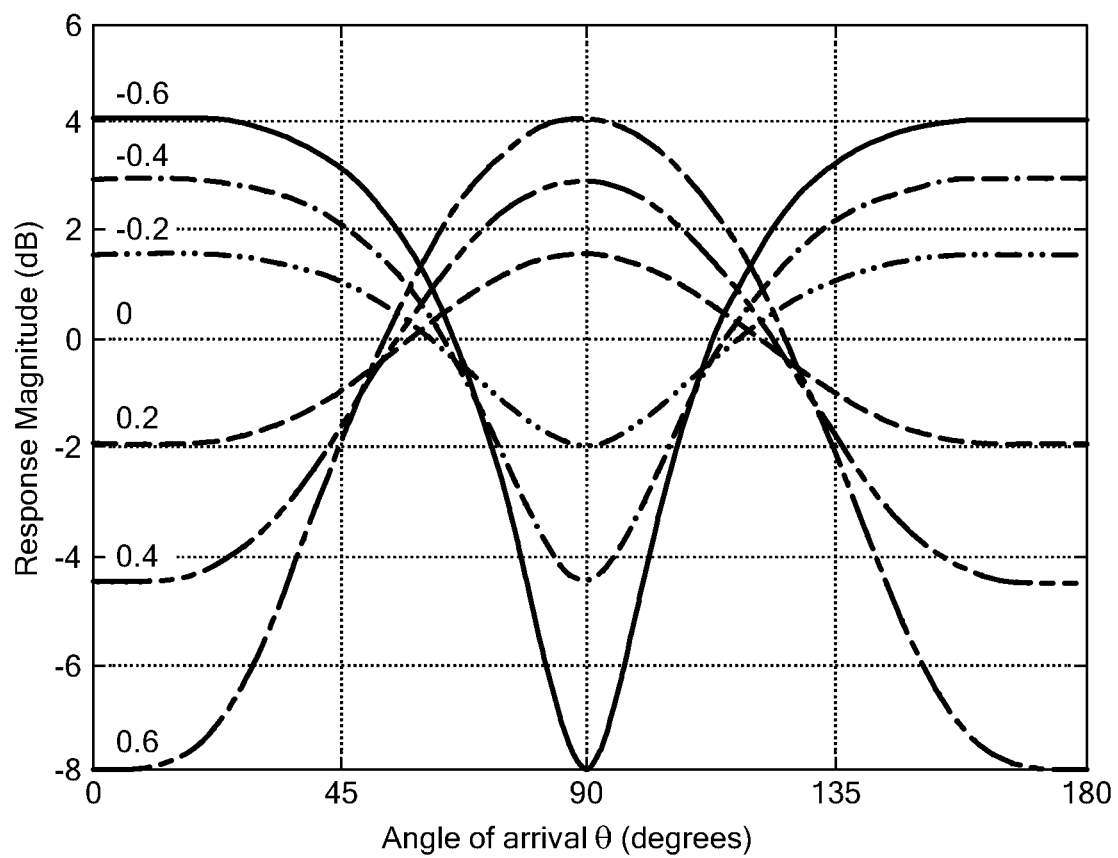
FIG. 8 is a diagram illustrating some antenna responses that are achievable using different weighting schemes to linearly combine the antennas in FIG. 7.

In one embodiment, arrays of dipoles are used for the antennas 100, 110 of FIG. 6. A dipole has an omnidirectional response pattern (in the plane). As illustrated in FIG. 7, two dipoles separated by a distance d receive energy from a signal at angle θ with center frequency f=c/λ, where c is the speed of light and λ is the wavelength. If the outputs of the two antennas are combined with weights $w_1$ and $w_2$, the equivalent complex baseband response is:

$$w_1 + w_2 e^{j2\pi d/\lambda \cos(\theta)}, \quad (1)$$

which depends on the angle of arrival θ. FIG. 8 shows some obtainable responses for various linear combinations $w_1$ and $w_2$. As can be seen, responses varying from mildly directional to those with deep nulls can be obtained. Many other antenna configurations and combining approaches are possible.

An implementation such as shown in FIG. 6 may utilize a small subset of responses. These can be conventionally obtained through use of fixed amplifiers or attenuators, resistive combiners, PIN diodes, or any combination of the above. Such an implementation may also allow the weights $w_1$ and $w_2$ to be set arbitrarily. These can be obtained, for example, by using programmable amplifiers or attenuators.

The spatial response patterns of the antennas 100, 110 can be either known or unknown. Different algorithms may be applied depending on the situation.

Figure 9:
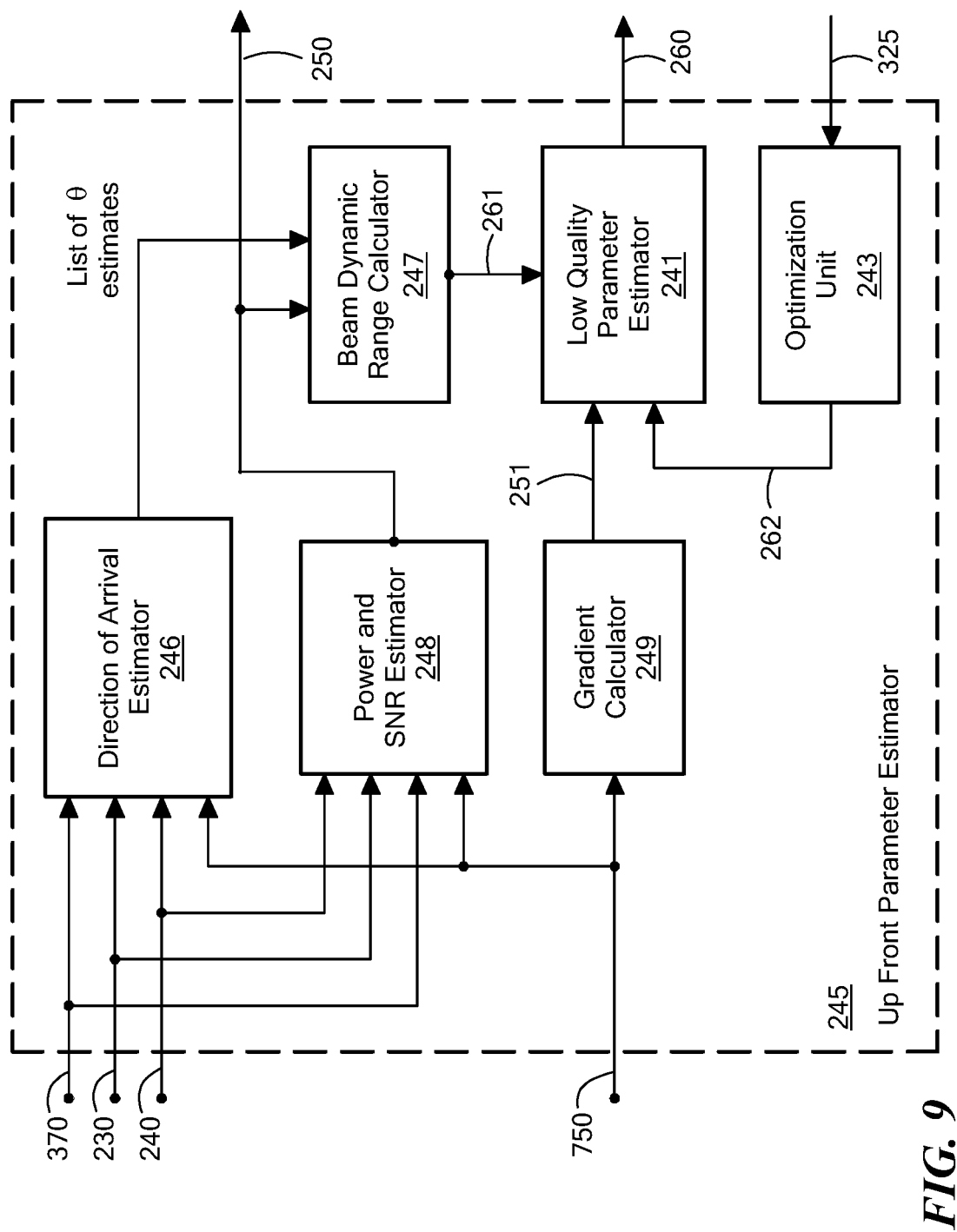
FIG. 9 is a block diagram illustrating functionality within an up front parameter estimator unit in accordance with an embodiment.

The up front parameter estimator unit 245 of FIG. 4 computes parameters needed by the cognitive engine 300 from raw RF linear combiner outputs on lines 230, 240 and from the A/D converter output on line 750. Similarly, the up front parameter estimator unit 245 of FIG. 6 computes parameters needed by the cognitive engine 300 from an output of a single variable linear combiner 211 on line 370 and the A/D converter output on line 750. FIG. 9 is a block diagram illustrating functionality within up front parameter estimator unit 245 in accordance with an embodiment. For the case where the antennas 100, 110 have known beam patterns, a first step may be to estimate the directions-of-arrival of each of the desired sources in a local coordinate system, indexed by angle θ, using the direction of arrival estimator 246 of FIG. 9. Any conventional direction-of-arrival estimation technique may be used. Well known techniques include, but are not limited to: MUSIC, ESPRIT, Maximum-Likelihood, weighted subspace fitting, the single channel DF method disclosed in U.S. Pat. No. 7,126,533, and related methods. Pure analog methods, such as the known analog subspace tracking approach can be used utilizing the information on lines 230-240, or pure digital methods using the digital signal on line 750 and the technique of U.S. Pat. No. 7,126,533 can be used. The estimated direction of arrivals are combined with the known antenna beam patterns and RF linear combiner patterns by unit, to enable choice of the best linear combination by the cognitive engine 300.

For a fixed set of N known RF linear combiners and known antenna array patterns, let the $n^{th}$ known combined beam pattern be denoted by $b_n(\theta)$, for n=1, ..., N, where θ indexes the direction-of-arrival. The parameter $b_n(\theta)$ is then the complex amplitude response of combination n to a unit-amplitude signal from direction θ.

Let the direction-of-arrival estimates of the two sources be denoted by $\theta_1$ and $\theta_2$, and the powers of the two sources be denoted by $p_1$ and $p_2$, respectively. Without loss of generality, we assume $p_1 \geq p_2$. The options for dynamic range compression may be calculated by the beam dynamic range calculator 247 according to:

$$\frac{p_1 |b_n(\theta_1)|^2}{p_2 |b_n(\theta_2)|^2} \quad (2)$$

for n=1, ..., N. These are communicated on line 261 to the low quality parameter estimator 241.

For systems where N is very large, which may occur, for example, in systems with programmable amplifiers, it may not be cost effective or practical to enumerate all combinations and test equation (2) exhaustively. Instead, it is more efficient to collect all the degrees of freedom that the system can control into a vector m. The elements of m might be amplifier gain settings and phase shift settings, or perhaps physical settings to control the orientation of physically steerable antennas. The parameter $b_m(\theta)$ is now commonly referred to as an "array manifold", and the beam dynamic range calculator 247 supplies the function of m:

$$\frac{p_1 |b_m(\theta_1)|^2}{p_2 |b_m(\theta_2)|^2} \quad (3)$$

on line 261 instead of providing the values of dynamic range as is done when the number of beams is low. Also, in this case, unit 241 of FIG. 9 would provide an estimate or prediction of the low quality parameter estimates for one or more values of m. A fine tuning iterative process would ensue between the cognitive engine 300 and the up front parameter estimator 245 that would result in a final iteration and output on line 325 of FIG. 5 that would correspond to a "high-grade" dynamic range and the corresponding setting for m, which would define the beam that would provide this high-grade dynamic range. Specifically, the value or values of m used in unit 241 of FIG. 9 would be adjusted by the optimization unit 243 which could employ any well known optimization or search algorithm known to those skilled in the art of optimization. Optimization unit 243 takes as input a beam grade and its corresponding value of m or a list of beam grades and their corresponding values of m on line 325 from the beam grading unit 320 of FIG. 5. The optimization unit 243 of FIG. 9 then provides a new value or values of m on line 262 to unit 241 for another iteration of low quality parameter estimation corresponding to the new value or values of m. This continues until the optimization unit 243 determines that no more iterations are necessary or until some threshold number of iterations has been reached.

A power and SNR estimator 248 within the up front parameter estimator 245 of FIG. 9 operates in a tracking loop via line 750. The estimator 248 assumes only one RF linear combiner is operating at a time. Combiners are switched periodically and at a faster rate than the changes in channel parameters so that the signal powers and multipath environment do not appreciably change during the processing snapshot. The estimator 248 also assumes the array manifold is known and the direction of arrival estimates are tracked (so that array response matrix A is entirely known). It also assumes that the noise power $\sigma^2$ is being tracked.

If the $n^{th}$ RF linear combiner measurement output is denoted by:

$$y_n^H = c_n^H A S_n$$

for n=1, ..., N, where $c_n$ is the linear combiner weighting vector, and $S_n$ is the matrix of source transmissions for the $n^{th}$ measurement (one source per row), and the superscript H denotes the Hermitian transpose operation, then the following steps may be used to calculate the signal powers and SNRs:

1) Calculate the combined array response and RF linear combiner response $d_n^H = c_n^H A$, and calculate the average power for the $n^{th}$ combiner output via $$r_n = \frac{1}{K} y_n^H y_n.$$

Note that:

$$r_n = c_n^H A \left(\frac{1}{K} S_n S_n^H\right) A^H c_n = d_n^H P d_n = |d_n|^{2T} p \quad (4)$$

where $|d_n|^2$ denotes the column vector of the magnitude-squared of the elements of $d_n$ and p denotes the main diagonal of P reshaped into a column vector. Note that this assumes that the source's powers remain reasonably constant across RF linear combiner measurements, but that the actual transmitted symbols are allowed to vary.

2) Stack the $r_n$ in equation (4) into a column vector as follows:

$$r = \begin{bmatrix} r_1 \\ \vdots \\ r_N \end{bmatrix} \quad (5)$$

and stack the $|d_n|^{2T}$ in function (4) into a matrix:

$$E = \begin{bmatrix} |d_1|^{2T} \\ \vdots \\ |d_N|^{2T} \end{bmatrix}. \quad (6)$$

Note that with these definitions and from function (4), we have r=Ep.

3) Solve for the vector of source powers via $p = E^{-1} r$.
4) Solve for the source SNRs using SNRs $p_s/\sigma^2$, for s=1, ..., S.

The estimated SNRs, as well as signal powers and noise power estimates, may then be communicated on line 250 to the cognitive engine 300 (as shown in FIGS. 4 and 6, line 250 in FIG. 9 is coupled to cognitive engine 300).

The low quality parameter estimator 241 aggregates information from the gradient calculator 249 and the dynamic range functions on lines 261 from the beam dynamic range calculator 247 for transmission to the cognitive engine 300 on line 260. The low quality parameter estimator 241 might also generate one or more of bandwidths, modulation type, carrier offset, phase offset, or others based, for example, on what the cognitive engine 300 needs.

The function of the cognitive engine 300 in FIGS. 4 and 6, when in the single beam mode, is to optimize the choice of the beam to enable successful demodulation by the MUD. More specifically, the cognitive engine 300 evaluates the environmental beam-dependent measures and makes a choice as to which beam to use to render the current operating point successful with the existing front end and MUD algorithm implemented within the receiver.

In some implementations, a constraint may be added that prevents the higher power user's received power from going below what would be needed to receive this user's rate. In other words, the beam grading unit 320 in FIG. 5 would incorporate into its grade the power that is required to achieve the current rate. There are several nuances in this, for example, the grade will be a function of the actual rate plus some rate buffer that is typically expected to be the difference between the rate an actual system can achieve and the theoretic capacity value. Other appropriate corrections could occur in the grading process as would be known to those skilled in the art of wireless communication and information theory.

The choice of the beam could be a function of which MUD is available in the receiver, and a rate-tool, such as the one described in a co-pending U.S. patent application entitled "Method and Apparatus for Rate Determination in a Radio Frequency System" by McLeod, et al., which is commonly owned with the present application, can be used to determine what the bound on the higher user's power needs to be.

The case where the antennas 100, 110 do not have known beam patterns can also be handled by the embodiment of FIG. 6. This situation can arise when, for example, (1) direction-of-arrival estimates cannot be generated for the sources, (2) there is severe, variable multipath due to nearby reflectors in the environment, (3) the antennas are on a vehicle and are subject to changing calibration because of door/hatches being in an opened or closed configuration, or (4) antenna flexing. In this case, neither of the functions (2) or (3) can be generated by the beam dynamic range calculator 247 and provided to the cognitive engine 300. For successful A/D conversion in A/D converter 700 in this case, it is assumed that operation is taking place in a tracking loop, and it is also assumed that the setting of the RF linear combiners 201, 210 and AGC 600 are such that no saturation is occurring in A/D converter 700, and that a reasonable operating point (comprised of the implemented multiuser detector and achievable rates triplet) is currently obtained by the cognitive engine 300. The channel and the source locations and transmitted powers are assumed to change slowly, relative to the tracking loop update dynamics.

Instead of functions (2) or (3), the low quality parameter estimator 241 may utilize gradient information provided by a gradient calculator 249 to calculate updates to the RF linear combiner configuration. The gradient calculator 249 estimates a gradient matrix between each RF linear combiner weight and the signals' dynamic ranges at the AGC output, the low quality parameter estimator 241 then uses these gradient estimates to step in a "downhill" direction to a more favorable dynamic range.

The assumption then is that this algorithm is operated in a tracking loop, where it is assumed that the setting of the RF weights and AGC are such that no saturation is occurring and that a reasonable multiuser capacity region is currently obtained, relative to the rates of the two interfering signals (e.g. the rate pair operating point is within the portion of the multiuser capacity region that corresponds to the MUD detector that has been implemented within the receiver.) The channel and the source locations and transmitted powers are assumed to change slowly, relative to the tracking loop update dynamics.

For the embodiment of FIG. 6, the current weights may be represented by a vector w. The parameter estimator that is required for the MUD algorithm estimates the SNRs of all signals present, so it is also capable of estimating the dynamic range D at the output of the AGC 600. One possible approach to providing a "cold" estimate of the received amplitudes at this point in the processing chain is to rely upon training sequences within the transmitted signals. Once a "lock" has been obtained on the signals and the MUD algorithms are engaged in detection/decoding of the signals, the signal parameters may be continuously tracked and updated for the MUD algorithm to continue to work properly. An additional metric and control feedback may be added to this "in-MUD" parameter update processing that monitors the dynamic range between the interfering signals and sends new weights to the beam combiner controller/selector to properly adjust the dynamic range when it approaches the danger level as determined by the AGC+A/D effects. The Weight Control Algorithm then calculates small, random changes Δw to the weights. The new weights w+Δw are applied, and the new dynamic range D' measured. The next setting of the weights is:

$$w' = w - \mu \frac{D' - D}{\Delta w} \qquad (7)$$

where 0<μ<1 is used to account for the channel dynamics. A smaller μ will lead to slower but more stable adaptation. However, μ cannot be too small as the algorithm may then fail to track channel dynamics.

Referring back to FIG. 5, the cognitive engine 300 will now be described in greater detail for a specific embodiment. The operating point which is output by operating point determination unit 310 along line 315 is defined by the rates of all the signals "seen" by the receiver as well as the MUD algorithm that has been implemented within the receiver. The nomenclature used throughout this description to represent the operating point is:

$$O=(R_a, R_A, \text{MUD}_b), \qquad (8)$$

where $\text{MUD}_b$ is the specific MUD algorithm implemented in node b's receiver, and $R_a$ and $R_A$ are the rates of the information contained within the signals transmitted by nodes a and A, respectively. The rate of the information within the signal transmitted by node a is expressed in the number of information bits per channel use (or information bits per baud pulse or per modulated symbol) as follows:

$$R_a = \frac{k}{n} \log_2(M) \qquad (9)$$

where M is the order of modulation and $\log_2(M)$ is the number of modulated bits per channel use, and k/n is the coding rate (i.e., the number of information bits per modulated bits). For example, if the modulation scheme is 8-ary phase shift keying (8PSK), then M=8 and there are 3 bits embedded in every pulse transmitted. If an error correction code was applied between the source of information bits and the modulator, and if that error correction code were a k/n=½ rate code, then the rate of the information conveyed in the signal transmitted by node a would be $R_a$=½×3=1.5 information bits per channel use.

The rate of the signal transmitted by node A could be one of two definitions depending upon the configuration of the receiver within node b. If node b "knows" the code book used by transmitter A for the error correction coding of node A's signal and if node b employs a MUD that takes advantage of node A's error correction code, then, using the modulation and code rates employed in transmitter A, we would have:

$$R_A = \frac{k}{n} \log_2(M) \qquad (10)$$

If, on the other hand, node b does not know or does not use the error correction embedded within transmitter A's signal, then we have:

$$R_A = \log_2(M) \qquad (11)$$

The information that is conveyed to the cognitive engine 300 over line 980 would be the specific MUD algorithm that has been implemented within the subject receiver. Examples of various MUD algorithms that might be employed within the subject receiver are: (1) matched filter successive interference cancellation (MF SIC), (2) minimum mean squared error MUD (MMSE MUD), (3) MMSE SIC, (4) Turbo MUD, (5) M-Algorithm MUD, (6) other MUDs that attempt to mimic much of the optimum MUD processing, as well as many other possible MUDs.

To complete the definition of operating point which is output by unit 310 along line 315, we shall provide an example where we determine the operating point for the following case:

1. Node a
   (a) Modulation=8PSK (M=8, $\log_2(M)=3$)
   (b) Error Correction Code = $\frac{7}{8}$ rate convolutional code ($k = 7, n = 8$)

2. Node A
   (a) Modulation=QPSK (M=4, $\log_2(M)=2$)
   (b) Error Correction Code = $\frac{3}{4}$ rate Reed Solomon code ($k = 3, n = 4$)

3. Node b
   (a) MUD type=MMSE SIC (b) Use a's error correction code within
   the MUD: YES $\left(R_a = 3 \times \frac{7}{8} = 2 \times \frac{5}{8} = 2.625\right)$ (c) Use A's error correction code within the MUD: NO ($R_A=2$)

In the above case, the operating point is:

$$O=(2.625, 2, \text{MMSE SIC}). \qquad (12)$$

The operating point determination unit 310 takes as input low quality signal parameter estimates over line 260 and the type of MUD algorithm that has been implemented in the receiver over line 980. An operating point can be determined with these two inputs. If higher quality signal parameters are available over line 970 and/or line 850, this unit may use the highest quality signal parameter values available to determine the operating point.

The low quality signal parameter estimates on input line 260 may include some or all of the following values. Those marked with an asterisk (*) are required for determination of the operating point. The other values may be used by the beam grading unit 320 to compute a grade for each beam. As will be described in greater detail, the up front parameter estimation unit 245 may provide these values.

Number of interfering signals*
Modulation (M) for each signal*
For each signal, whether or not the receiver will perform error correction decoding*
If the receiver will perform error correction decoding, the coding rate for that signal*
Baud timing offset of the interfering signals
Carrier frequency for each interfering signal
Cross correlation between every pair of interfering signals As described previously, the up front parameter estimation unit 245 may generate a list of SNRs for each beam on line 250. This list may then be input to the cognitive engine 300 (e.g., see FIG. 5). This list comprises one value of SNR for each interfering signal as it is received by each beam. For example, if there are two interfering signals and 10 possible beams, this list could be represented as a table with 10 rows, one for each beam, with two SNR's in each row. It is important that a single column in this table contains the SNRs corresponding to the same transmitter. Some beams would result in the SNR being the higher of the two signals, while other beams would result in this same signal being the lower of the two signals. It is important not to confuse the signals in this table.

Input Line 970 of cognitive engine 300 may include information typically produced within state of the art radio receivers that help the radio determine if it is meeting the necessary quality of service (QoS) by checking the packet drop rate for the signal of interest. If the packet drop rate is higher than some acceptable threshold, then the QoS is not met. In addition, typical to state of the art radio receivers is the possession of information that defines the waveform in use, to include assignments of values to the following: modulation scheme, error correction coding scheme, frequency band or center frequency and bandwidth, packet/frame structure, etc. This information may be known about one or all of the interfering signals and may, therefore, not need to be estimated by unit 245, but instead, unit 245 may simply need to determine the association of each waveform parameter list with the incoming environmentally determined values such as SNR, timing offset, frequency offset, etc.

Input Line 850 of cognitive engine 300 is a byproduct of the MUD processing since many MUD algorithms require very good estimates of each of the interfering signals' SNRs and/or receive amplitudes, baud timings, carrier offsets, modulation schemes, coding schemes, etc. The estimates made by MUD unit 900 in order to successfully perform the MUD may be of higher fidelity than is possible using only the analog signals available to the up front parameter estimation unit 245. MUD unit 900, however, will only have computed estimates for the selected beams.

Beam grading unit 320 of cognitive engine 300 (see FIG. 5) performs a test to determine if an operating point is feasible for each beam or combination of beams under consideration. If it is feasible, this unit then computes a grade that scores the level of "goodness" of this beam or combination of beams for the MUD processing that will be performed in the back end of the subject receiver.

The ordered beam list generation unit 330, for the single beam mode of operation, will generate a list that contains only one beam or beam combination. The beam number (for the case of the single-beam MUD) or set of numbers (for the case of multispatial MUD) output by unit 330 along line 360 indicates the beam or beam combination set that was scored the highest by unit 320.

The beam selector 365 of FIG. 4 takes information about the selected beam or set of beams from line 360, and performs the operation of multiplexing the output of the selected combiner (one of units 201-210) onto line 370. For each beam, this is a conventional operation (select one of a set of analog lines), which may be performed using, for example, isolation amplifiers, hybrid couplers, or analog switches.

The down converter 400 may include a conventional device that takes a down conversion tone 390 supplied by a conventional phase reference oscillator, and mixes it with the post-analog beamformed RF signal 370. The operation is used to convert a signal with an RF center frequency to a much lower baseband frequency, where ensuing digitization hardware typically functions.

The low pass filter 500 may include any type of filter that limits the frequency extent of signals passing through it. It is generally required so that ensuing digitization operations function properly in that aliasing of out of band signals do not occur.

The AGC unit 600 is a device that attempts to set the overall signal amplitude level that results from the combination of signals-of-interest, signals-not-of-interest, and noise. It accepts low-pass filtered information from filter 500 and acts to scale the amplitude of that signal to below the full scale input of the A/D converter 700, with some margin to avoid saturation or damage to the receiver components given this amount of gain. Additional consideration may be given to setting the gain so that the noise-like effect of quantization by the A/D converter 700 is generally low.

The A/D converter 700 is a conventional device that performs the actual digitization of the analog signal output by AGC unit 600. As has been previously noted, A/D converters sometimes have severe limitations in that the peak input signal level must be controlled rather tightly to avoid saturation and perhaps device damage. In addition, there may be a trade-off of cost versus dynamic range performance and capability inherent in choice of A/D converters. The ability for the cognitive engine 300 to intelligently and cognitively choose and/or reshape the total dynamic range of signals input to A/D converter 700 will allow a great cost reduction in that less capable A/D converters can be used.

The power and SNR estimator 248 can be performed more simply (without use of a tracking mode) in the multi-beam mode, by making use of the multiple combiner/beams. It is more in line with conventional blind source separation type approaches, where multiple simultaneously gathered measurements are used.

The measurement model is:

$$Y = CAP^{1/2}S + N \tag{13}$$

where:
Y: N×K matrix of measured data
N is the number of combiners and K is the number of samples
K≥N≥M≥S
M is the number of antennas and S is the number of sources (transmitters)
C: N×M matrix of known linear combiner weights
$C^+$: M×N pseudo inverse of the C matrix
A: M×S matrix containing the unknown array response, but $|A_{ij}|^2 = 1$
P: S×S, matrix of signal powers (diagonal matrix of unknown positive values)
S: S×K, matrix containing the signals, one row corresponding to typically hundreds of symbols transmitted by each source or transmitter (unknown, but signal rows uncorrelated)
$R_s(\tau) = E\{SS_\tau^H\}$ (temporal signal cross-correlation), where $S_\tau$ is the matrix S, shifting in time by $\tau$ samples. $R_s(\tau)$ is assumed to be diagonal, and $R_s(0) = I$, where I is the identity matrix (since matrix P defined above accounts for the signal powers)
N: N×K matrix of colored white Gaussian noise with $E\{NN^H\} = \sigma^2 I$, $\sigma^2$ unknown The effect of the antennas are modeled as merely phase shifts in a matrix A (treated as unknown phase shifts here for simplicity; other approaches using well known methods are possible if the array is calibrated). The signal powers are collected into a diagonal matrix P. It will be assumed that several RF linear combiners are available. In this situation, the signal and noise powers, and the SNRs may be calculated using the seven steps below. This approach is an adaptation of the second order blind identification (SOBI) algorithm.

1) Estimate $\sigma^2$ and S by minimum description length (MDL) or similar methods that determine subspace dimensionality. The noise power estimate $\sigma^2$ is output on line 250.
2) Calculate $Z = C^+ Y$ and if M>S perform the additional "noise cleaning" operation as follows. Calculate the eigenvectors of $ZZ^H$ corresponding to the largest S eigenvalues, and collect these into an M×S matrix U. Then, calculate $Z_c = U^H Z$ and set Z equal to $Z_c$, Z is now of size S×S. Note that U and A span the same space so that $U^H A$ is full rank.
3) Form two temporal empirical covariance matrices:

$$R_z(\tau) = \frac{1}{K} ZZ_\tau^H \tag{14}$$

for $\tau = \tau_1$ and $\tau = \tau_2$ (and neither equal to zero). $Z_\tau$ is equal to Z shifted in time by $\tau$ samples. The $\tau$'s are to be chosen to be different from each other, and to approximately correspond to the reciprocal of the widest bandwidth of the signals of interest. Note that $\tau_1 = 0$ could be utilized if the excess estimated covariance error $\sigma^2 I$ is subtracted from the calculation of (14). Note from (13) that asymptotically $R_z(\tau) = U^H A P^{1/2} R_s(\tau) P^{1/2} A^H U$.

4) Calculate $G = R_z(\tau_1)(R_z(\tau_2))^{-1}$. Note that asymptotically:

$$G = (U^H A) R_s(\tau_1) R_s^{-1}(\tau_2)(U^H A)^{-1}$$

5) Calculate the eigenvectors of G, and collect them into a matrix V. Techniques for performing this decomposition are well known. Note that V and $U^H A$ are related by multiplication of an arbitrary unknown diagonal phasor matrix D and an arbitrary unknown permutation matrix Π, via $V = U^H A D \Pi$. This ambiguity is well known in the SOBI method and has no negative impact on our method.
5) Calculate $W = V^{-1} Z$. Note that it can be shown that $WW^H = \Pi^H P \Pi$, so that W contains the signal power information we seek.
6) Calculate the estimated signal powers as follows. Let $w_i^H$ be the i th row of W. Then the estimated signal powers are calculated as $p_i = w_i^H w_i / K$, for i=1, . . . , S.
7) Calculate the SNRs via: $SNR_i = p_i / \sigma^2$, for i=1, . . . , S. These values are output on line 250.

FIGS. 10 to 13 show processes that can be implemented within a co-existence cognitive radio receiver, such as receiver 400 of FIG. 4 or receiver 600 of FIG. 6, according to some embodiments. The receiver can be a MUD-enabled receiver and, in some embodiments, a SIC MUD-enabled receiver. The illustrative processes can be used to choose a beam for decoding one or more signals of interest (SOIs) from among one or more interfering signals. The receiver can have multiple antennas (e.g., antennas 100, 110 of FIGS. 4 and 6) to supply signals to linear combiners serving as beamformers. The linear combiners can be a set of fixed linear combiners, as in FIG. 4, or a programmable linear combiner, as in FIG. 6. In general, there are N possible beams. In the case of fixed linear combiners, N can be equal to the number of fixed linear combiners. Alternatively, in the case of a programmable linear combiner, a beam can be constructed to point in an infinite number of directions, therefore a set of N beams can be chosen to be a very large set. Thus, techniques for efficiently finding the "best" beam or a suitable beam among a large number of possible beams are needed.

The flow diagrams show illustrative processing that can be implemented within a cognitive radio receiver. The diagram blocks may represent steps performed by computer software instructions or by functionally equivalent circuits such as a digital signal processor (DSP) circuit or an application specific integrated circuit (ASIC). In some embodiments, the illustrated processes can be implemented, in whole or in part, within a signal parameter estimation unit (e.g., unit 245 of FIG. 9) and/or a cognitive engine (e.g., cognitive engine 300 of FIG. 5). The sequence of blocks in a flow diagram is merely illustrative and, unless otherwise stated, the functions represented by the blocks can be performed in any convenient or desirable order.

Figure 10:
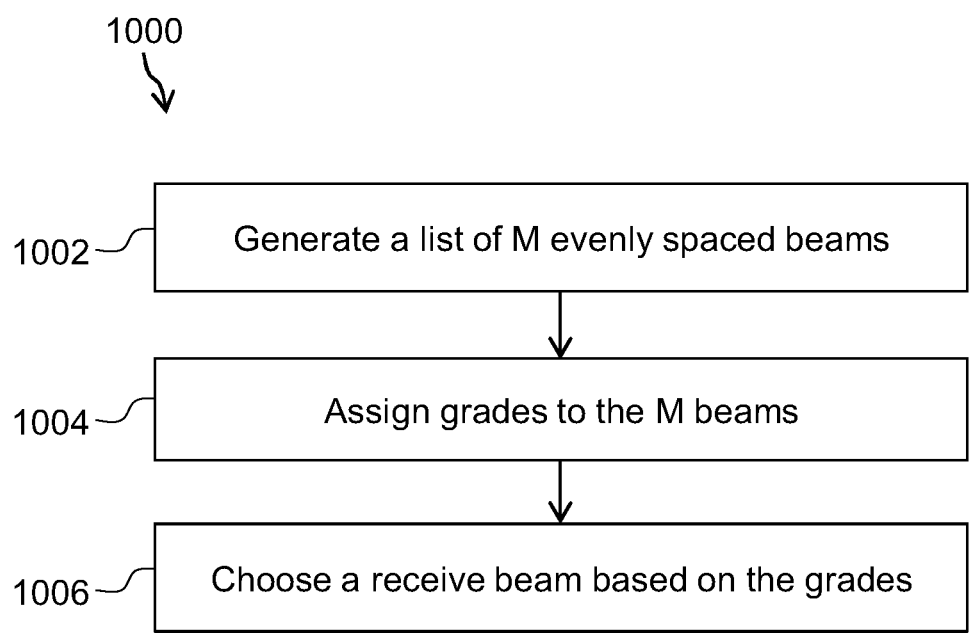
FIGS. 10, 11, and 12 are a flow diagrams showing processes for choosing a beam, according to some embodiments.

Referring to FIG. 10, an illustrative process 1000 can be used to choose a beam suitable for decoding a SOI from among one or more interfering signals. In some embodiments, process 1000 can be used with a SIC MUD-enabled receiver. The illustrative process 1000 can be used with a digital beamformer, analog beamformer, or mechanical dish.

At block 1002, a list of M evenly spaced (or approximately evenly spaced) beams can be generated. That is, from among the N possible beams, M<N beams can be equally spaced apart in terms of their relative angles can be generated. In one example, each beam's primary lobe (or maximum of its beam pattern) can point approximately 5 degrees away from its nearest neighboring beam's maximum/primary lobe. In this context, generating a beam can include generating a set of weights that can be used to linearly combine the antennas to point in a desired direction.

At block 1004, the M beams can be assigned a grade. Various techniques can be used to grade the beams. In general, a grade can be assigned based on how well the beam would allow demodulation of the SOI in the MUD such that the MUD is able to process the received signal containing interference signals and the SOI to produce the SOI's bit stream having a level of errors correctable by an error correction decoder in the receiver. In the case of a SIC MUD-enabled receiver, higher grades may be assigned to beams that result in moderately high to high interference to signal power ratios while maintaining high enough SOI SNR (interference-free) to close an acceptable link. The range of MUD-favorable SINRs (signal-to-interference-plus-noise ratios) can depend upon several factors, such as degree of correlation between the interfering signals, their relative rates or levels of randomness, how many interfering signals, etc. As an example of a range of MUD-favorable SINRs for a SIC MUD receiver when there is one interfering signal and one SOI is −30 dB to −4 dB, where the interfering signal is in the range of 4 dB to 30 dB higher in received power than the SOI's received power. Techniques for determining SINR of a received signal are discussed below.

In one example, beam grade assignments can be based on an estimated entropy of the signal received by the given beam (the signal that contains both the SOI and one or more of the interfering signals). In particular, the beams can be assigned grades in proportion to the estimated entropy within the corresponding receive signal, with lower entropy signals being assigned higher grades. Entropy can be computed, for example, from I/Q samples of the post-beamformed signal.

It is appreciated herein that signals with lower entropy provide certain types of MUD receivers an advantage for better performance. One example is the optimal joint MUD for the case of two interfering QPSK signals. The optimal joint MUD performs best for the case in which the two maximally-interfering QPSK signals result in a 16-cluster received I/Q constellation where the 16 clusters are non-overlapping with some separation between them. This situation also is one with the lowest possible entropy for the case of two maximally interfering QPSK signals. If, instead, the relative powers of the two interfering signals were changed such that the 16 clusters overlapped (or "smeared") the entropy would be significantly higher and the optimal joint MUD would result in a high number of decoding errors. So, for this same example, a beam that results in 16 clusters that are substantially separated is preferable over a beam that results in 16 clusters that are so close together as to be indistinguishable from each other.

Figure 13:
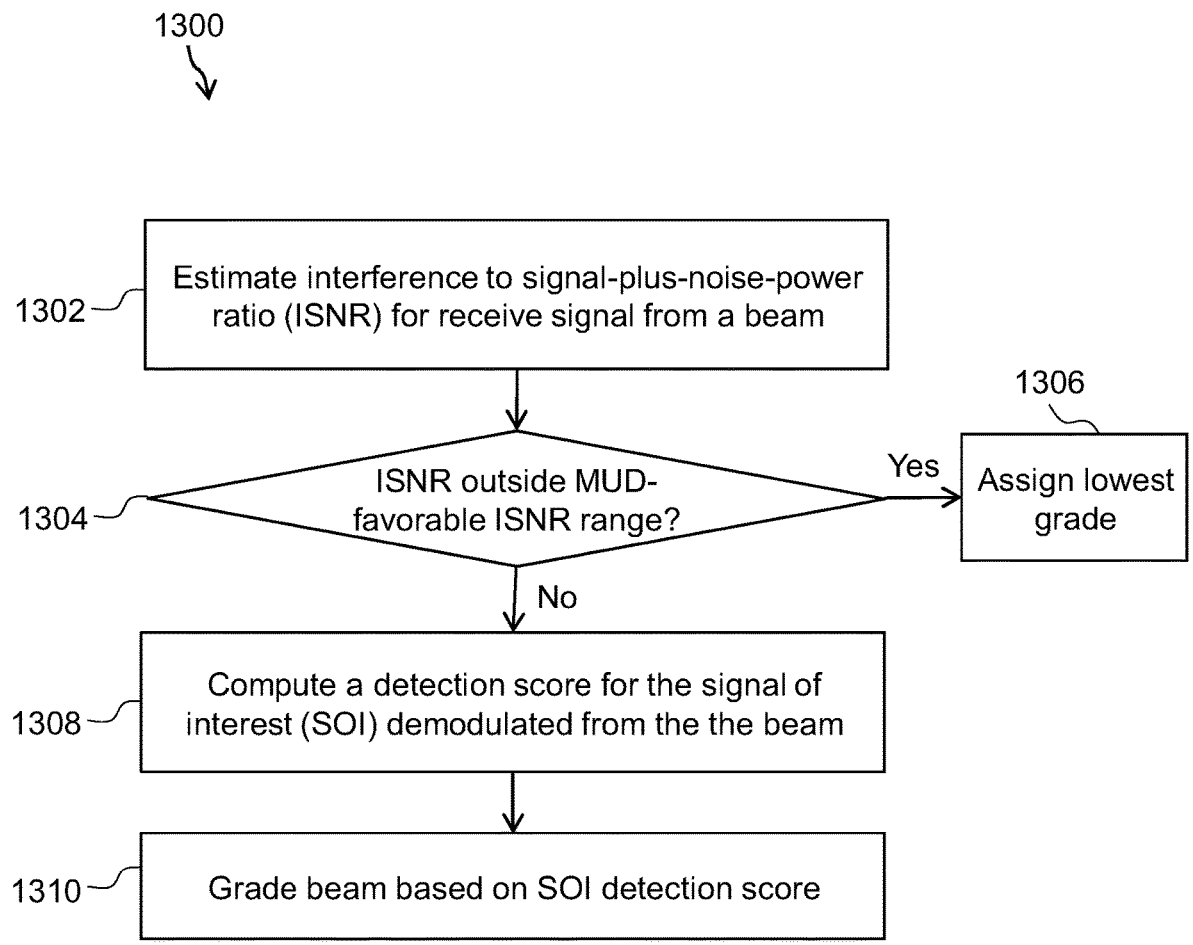
FIG. 13 is a flow diagram showing a process for grading a beam, according to some embodiments.

Another example of a beam grading technique is shown and described in the context of FIG. 13.

In some embodiments, beam grading can be based on an estimated power and SNR for each interfering signal received from the beam. The powers and SNRs of the interfering signals can be estimated or measured using, for example, techniques described above for power and SNR estimator 248 of FIG. 9. In some cases, it may be possible to estimate the interfering signal powers and SNRs from a beam without actually adjusting the linear combiner weights within the receiver. In particular, such estimates can be based on knowledge of the antenna beam patterns (i.e., the spatial response of the antennas linearly combined according to the beam weights) and knowledge or estimates of the interfering transmitter directions-of-arrival (DOA).

In some embodiments, multiple beamforming grades can be computed in parallel.

At block 1006, a receive beam can be chosen based on the grading. For example, the beam with the highest grade, or a grade above a predetermined threshold, can be chosen.

Figure 11:
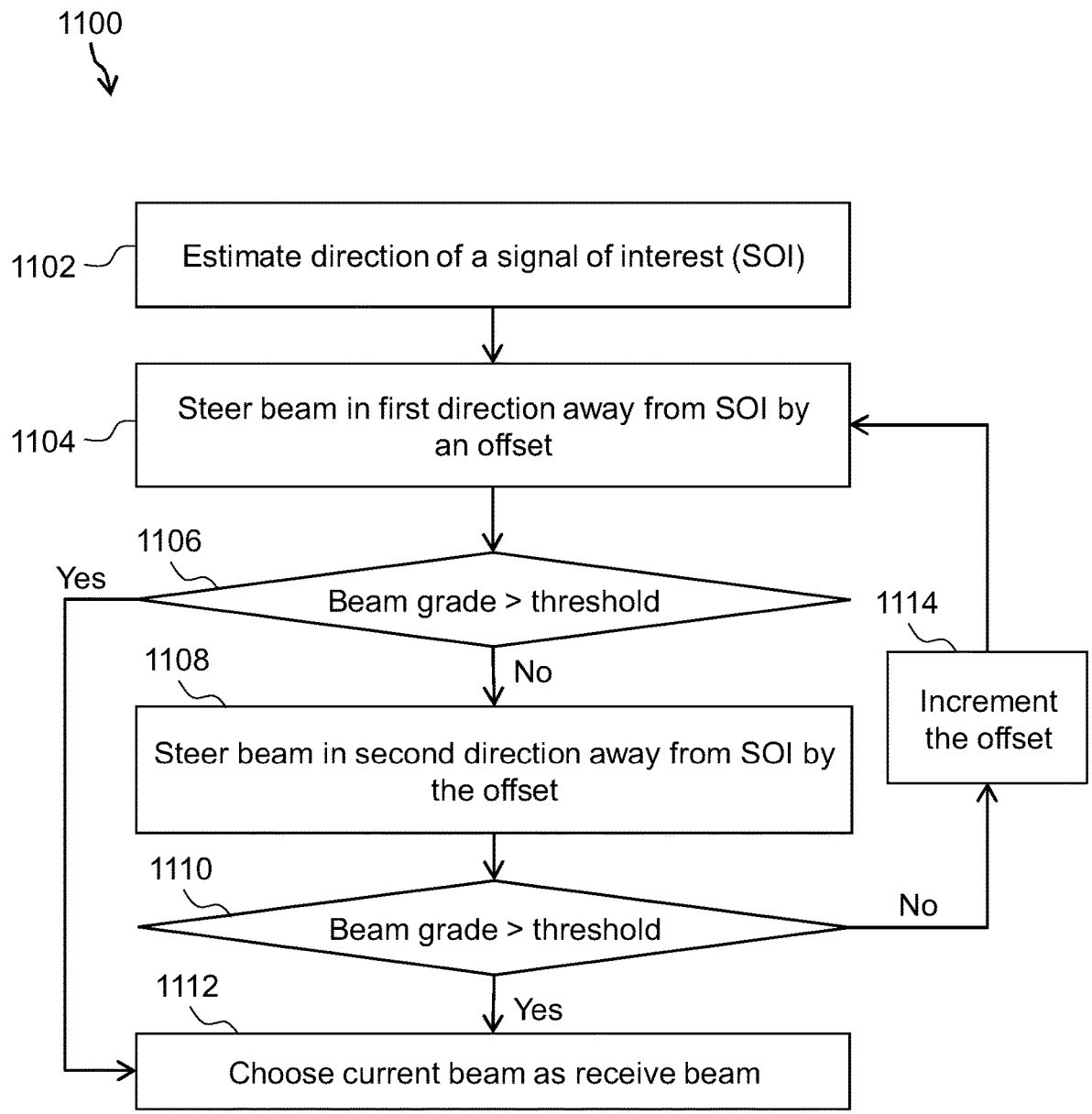

FIG. 11 shows another process 1100 can be used to choose a beam suitable for decoding a SOI from a received signal that contains both the SOI and one or more interfering signals. In some embodiments, process 1100 can be used with a SIC MUD-enabled receiver. The illustrative process 1100 can be used with a digital beamformer, analog beamformer, or mechanical dish.

At block 1102, the direction of arrival (DOA) of the SOI, or the approximate DOA of the SOI, can be estimated. In some embodiments, this can be done by computing an adaptive interference nulling beam that attempts to null the interferer while enhancing the SOI. The direction of the main beam resulting from this process can be used estimate to estimate the SOI's direction. An example of an adaptive interference nulling beam algorithm that can be used is MVDR (minimum variance distortion-less response).

At block 1104, the beam can be steered in a first direction away from the SOI's line of bearing as defined by its estimated DOA. The beam can be offset from the SOI, in the first direction, by a predetermined amount (e.g., 5 degrees). For example, referring to FIG. 7, if the SOI is estimated to be arriving at an angle $\theta$, then the beam can be steered to $\theta$+offset (here, "first direction" is arbitrarily chosen to be the positive, or counterclockwise, direction). The beam can be steered, for example, by applying corresponding weights to a programmable linear combiner, such as combiner 211 of FIG. 6, or by steering a mechanical dish.

At block 1106, the beam can be graded, for example, using any of the techniques described herein. If the beam's grade exceeds a predetermined threshold, then that beam at its current angle can be chosen as the receive beam (block 1112). Otherwise, processing can proceed to block 1108. In some embodiments, the beamforming grades can be computed in parallel (e.g., in the case of a mechanical dish).

At block 1108, the beam can be steered in a second direction away from the SOI's line of bearing. The second direction can be opposite of the first direction. The beam can be offset from the DOA, in the second direction, by the predetermined amount (e.g., 5 degrees). For example, referring to FIG. 7, if the SOI is estimated to be arriving at an angle θ, then the beam can be steered to θ-5 degrees (here, "second direction" is arbitrarily chosen to be the negative or clockwise direction).

At block 1110, the beam can be graded. If, the beam's grade exceeds the predetermined threshold, then the beam at its current angle be chosen as the receive beam (block 1112). Otherwise, at block 1114, the offset amount can be incremented by a predetermined amount (e.g., 5 degrees) and processing can repeat from block 1104.

Thus, it can be seen that illustrative process 1100 incrementally steers the beam away from the SOI's line of bearing in both directions until a suitable beam angle is found. In other words, the beam "fans out" in both directions away from the SOI. In some embodiments, two separate beams can be iteratively steered in opposite directions away from the SOI. It is appreciated that process 1100 can be used to efficiently find the "best" beam or a suitable beam among a large number of possible beams.

At block 1112, the chosen beam can be used to decode the SOI within a SIC-enabled receiver. If the link quality subsequently degrades (e.g., if the packet drop rate becomes too high), then process 1100 can be repeated to find a new suitable beam angle. This may be necessary, for example, if the SOI transmitter and/or an interfering transmitter have moved.

Figure 12:
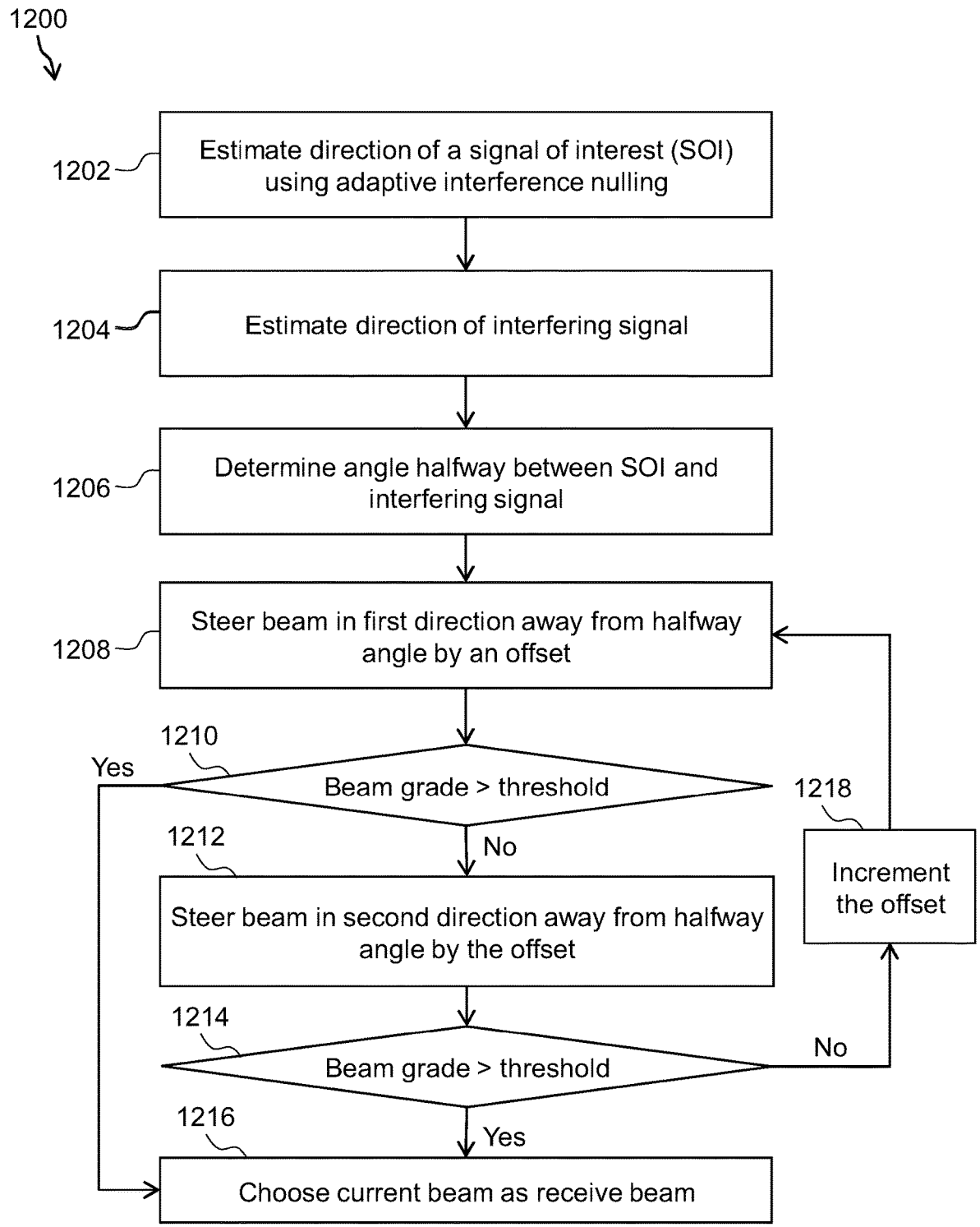

FIG. 12 shows another process 1200 can be used to choose a beam suitable for decoding a SOI from received signal containing the SOI and one or more interfering signals. In some embodiments, process 1200 can be used with a SIC MUD-enabled receiver. The illustrative process 1200 can be used with a digital beamformer, analog beamformer, or mechanical dish.

At block 1202, the direction or DOA of the SOI can be estimated using, for example, an adaptive interference nulling beam that attempts to null an interfering signal while enhancing the SOI. The direction of the main beam resulting from this process can be used estimate the SOI's direction.

At block 1204, the direction of the interfering signal can be determined using, for example, adaptive interference nulling. Here, a nulling beam can be computed that attempts to null the SOI so that it points in the direction of the interfering signal.

At block 1206, the angle or direction halfway between the SOI and interfering signal can be calculated or otherwise determined.

At block 1208, the beam can be steered in a first direction away from the halfway angle by a predetermined offset amount (e.g., 5 degrees).

At block 1210, the beam can be graded using, for example, any of the techniques described herein. If the beam's grade exceeds a predetermined threshold, then that beam at its current angle can be chosen as the receive beam (block 1216). Otherwise, processing can proceed to block 1212. In some embodiments, the beamforming grades can be computed in parallel (e.g., in the case of a mechanical dish).

At block 1212, the beam can be steered in a second direction away from the halfway angle by the predetermined offset amount.

At block 1214, the beam can be graded. If, the beam's grade exceeds the predetermined threshold, then the beam at its current angle can be chosen as the receive beam (block 1216). Otherwise, at block 1218, the offset amount can be incremented by a predetermined amount (e.g., 5 degrees) and processing can repeat from block 1208.

Thus, it can be seen that process 1200 of FIG. 12 is similar to process 1100 of FIG. 11, but whereas process 1100 "fans out" from the SOI, process 1200 "fans out" from the halfway angle between the SOI and the interfering signal. It is appreciated herein that, for SIC MUD-enabled receivers, the "best" beam often points between the SOI and an interfering signal or signals. Thus, process 1200 can be used to efficiently find the "best" beam or a suitable beam among a large number of possible beams.

FIG. 13 shows a process 1300 for grading a beam. Grading process 1300 can be used, for example, to grade beams as part of process 1000 of FIG. 10, process 1100 of FIG. 11, and/or process 1200 of FIG. 12. In some embodiments, process 1300 can be used with a SIC MUD-enabled receiver. The illustrative process 1300 can be used with a digital beamformer, analog beamformer, or mechanical dish.

At block 1302, interference to signal-plus-noise-power ratio (ISNR) or interference to signal power (ISR) can be estimated for a receive signal from a beam. The ISNR or ISR can be estimated by estimating the SOI's received power and the interfering signal's received power by any means appropriate for a given operating scenario or communication system. For example, in some communications systems, a SOI will embed a training sequence or pilot tone which can be used to estimate the received SOI's power and/or SNR (free of the interfering signal). The interfering signal's received power estimation procedure can be aided by the knowledge of the training or pilot tones embedded in that signal or if no knowledge of that exists, other algorithms may be used.

At block 1304, if the ISNR is outside of a predetermined MUD-favorable ISNR range, then the beam can be deemed unsuitable for decoding the SOI using MUD and, as such, may be assigned a lowest possible grade. Alternatively, the beam may be removed from consideration altogether. Otherwise processing can proceed to block 1308. As an example of MUD-favorable ISNR range (e.g., for use with a SIC MUD receiver) for a case of one interfering signal and one SOI is −30 dB to −4 dB, where the interfering signal is in the range of 4 dB to 30 dB higher in received power than the SOI's received power. In some embodiments, block 1304 can include comparing the ISNR to a minimum ISNR threshold. For example, a beam may be assigned the lowest possible grade if the corresponding ISNR value is less than 15 dB, meaning the interfering signal less than 15 dB greater in received power than the SOI. The MUD-favorable ISNR range/threshold can be user-defined or selected based on the type of MUD used or other operational or application-specific factors.

At block 1308, a detection score for the SOI demodulated from the beam (using a MUD) can be computed. In general, the detection score can be a measure of how well the SOI's symbols (e.g., cleaned-up I/Q samples) will be correctly demodulated. One such metric could be computed from available information provided by the post-MUD demodulator regarding the quality of the decoded symbols, such as packet drop rate, bit error rate, or number of corrected symbols even if packets are not dropped. Another score, for the case of a SIC MUD or a subspace nulling MUD (i.e., A MUD intended to clean up the signal, as opposed to a MUD that jointly demodulates both the SOI and interfering signal), could be made directly from the I/Q samples of the "cleaned up" signal, post-SIC, or post-subspace-nulling-MUD, such as how well the entropy in a cleaned-up signal matches the entropy expected from an interference-free received SOI signal.

At block 1310, the beam can be assigned a grade based on the SOI detection score. For example, the beam with the highest SOI detection score may assigned the highest grade (i.e., determined to be the favorable beam for the SIC MUD to process).

Embodiments described herein may be used advantageously in at least the following exemplary commercial settings.

Example 1: Co-channel interference-tolerable cognitive radio spectrum licensing. The FCC could allocate spectrum for adapt-only and smart-adapting (e.g. cognitive) radios. As radio frequency (RF) spectrum tends toward being completely occupied, the radios in each band are allowed and encouraged to "work out", on the fly, jointly agreeable situations in which interference is tolerated and useful communication continues. There is no requirement for radios to adhere to the same specification or be built to "talk with" one another to bring about the feasible co-existence. This is also no requirement for a controller that can "talk" to all systems that wish to use this band to help work out the terms co-existence.

Example 2: LTE-Advanced. The current critical need is to have self-deployed, self-configurable, loosely-controlled networks that are backward compatible with existing LTE systems. LTE-advanced will allow individuals to stand up their own LTE femto-cell without the need for a centralized provider. This can lead to many problems if done incorrectly, so non-provider deployed LTE networks need to be self-configuring. Also, the spectrum is already suffering from being too full.

Example 3: Embodiments also allow an increased number of users in cellular systems. This technology allows lower power femto-cells to coexist on channels in use by macro-cells, servicing additional user by more densely using resources already owned by cellular network operators. Deployment in handsets, that do not have the physical size or weight to support more than two antennas, would allow for higher frequency reuse due to automatic mitigation of interference, and enhances the performance that would be possible using only two antenna elements in a traditional manner, such as adaptive beamforming alone. This technology also enables service in stadiums and other venues in which there are thousands of users in close proximity. This technology does not require a large antenna array, unlike other technologies.

Example 4: Home networking. The density of home wireless technologies may be increased through application of radios that automatically co-exist with legacy equipment. This is particularly useful in dormitories and apartment buildings where many different WiFi access points exist in close proximity.

Disclosed embodiments may be implemented in any of a variety of different forms. For example, disclosed embodiments can be implemented within various forms of communication devices, both wired and wireless, such as television sets, set top boxes, audio/video devices, smartphones, laptop computers, desktop computers, tablet computers, satellite communicators, cameras having communication capability, network interface cards (NICs) and other network interface structures, base stations, access points, and modems.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for mitigating interference in a channel having multiple users, the method comprising:
    determining a starting angle based on a direction of a signal of interest (SOI);
    iteratively steering a beam away from the starting angle in opposite directions and calculating a grade of the beam, whereby, at each iteration, the beam is steered away from the starting angle in a first direction by an offset angle, steered away from the starting angle in a second direction by the offset angle, and the offset angle is increased;
    choosing the beam at a current angle as a receive beam based on the beam grade;
    receiving a signal using the receive beam; and
    decoding the SOI from one or more interfering signals using successive interference cancellation multi-user detection (SIC MUD) on the received signal.

2. The method of claim 1, wherein determining the starting angle comprises determining the starting angle as an estimated direction of arrival (DOA) of the SOI.

3. The method of claim 1, wherein determining the starting angle comprises:
    estimating a DOA of the SOI;
    estimating a DOA of an interfering channel; and
    determining the starting angle as an angle halfway between the estimated DOA of the SOI and the estimating DOA of the interfering channel.

4. The method of claim 1, wherein determining the starting angle comprises using an adaptive interference nulling technique.

5. The method of claim 1, wherein choosing the beam at the current angle as the receive beam comprises:
    determining that the beam grade exceeds a predetermined beam grade threshold.

6. The method of claim 1, comprising:
    determining a grade of the receive beam based on a detection score for the SOI.

7. The method of claim 6, wherein determining the grade of the receive beam comprises:
    estimating an interference to signal-plus-noise-power ratio (ISNR) of the received signal; and
    determining if the ISNR of the received signal is outside of a predetermined ISNR range.

8. The method of claim 6, comprising:
    determining grades of multiple beams in parallel.

9. The method of claim 1, wherein receiving the signal using the receive beam comprises receiving the signal using a digital beamformer.

10. The method of claim 1, wherein receiving the signal using the receive beam comprises receiving the signal using an analog beamformer.

11. A method for mitigating interference in a channel having multiple users, the method comprising:
    determining a starting angle based on a direction of a signal of interest (SOI) by:
        estimating a direction of arrival (DOA) of the SOI,
        estimating a DOA of an interfering channel, and
        determining the starting angle as an angle halfway between the estimated DOA of the SOI and the estimating DOA of the interfering channel;
    iteratively steering a beam away from the starting angle in opposite directions and calculating a grade of the beam;
    choosing the beam at a current angle as a receive beam based on the beam grade;
    receiving a signal using the receive beam; and
    decoding the SOI from one or more interfering signals using successive interference cancellation multi-user detection (SIC MUD) on the received signal.

12. The method of claim 11, wherein determining the starting angle comprises using an adaptive interference nulling technique.

13. The method of claim 11, wherein choosing the beam at the current angle as the receive beam comprises:
    determining that the beam grade exceeds a predetermined beam grade threshold.

14. The method of claim 11, comprising:
    determining a grade of the receive beam based on a detection score for the SOI.

15. The method of claim 14, wherein determining the grade of the receive beam comprises:
    estimating an interference to signal-plus-noise-power ratio (ISNR) of the received signal; and
    determining if the ISNR of the received signal is outside of a predetermined ISNR range.

16. The method of claim 14, comprising:
    determining grades of multiple beams in parallel.

17. The method of claim 11, wherein receiving the signal using the receive beam comprises receiving the signal using a digital beamformer.

18. The method of claim 11, wherein receiving the signal using the receive beam comprises receiving the signal using an analog beamformer.

* * * * *